United States Patent

Brown et al.

[15] 3,641,457
[45] Feb. 8, 1972

[54] HIGH-PERFORMANCE GAS LASER

[72] Inventors: Clyde O. Brown, Newington; Robert H. Bullis, Avon, both of Conn.

[73] Assignee: United Aircraft Corporation, East Hartford, Conn.

[22] Filed: Sept. 10, 1969

[21] Appl. No.: 857,649

[52] U.S. Cl. ........................................................331/94.5
[51] Int. Cl. ..................................H01s 3/05, H01s 3/09
[58] Field of Search....................................331/94.5

[56] References Cited

UNITED STATES PATENTS

| | | | |
|---|---|---|---|
| 2,832,666 | 4/1958 | Hertzberg et al. | 331/94.5 UX |
| 3,464,028 | 8/1969 | Moeller | 331/94.5 |
| 3,435,363 | 3/1969 | Patel | 331/94.5 |
| 3,435,373 | 3/1969 | Wolff | 331/94.5 |
| 3,509,486 | 4/1970 | Patel | 331/94.5 |

*Primary Examiner*—Rodney D. Bennett
*Assistant Examiner*—N. Moskowitz
*Attorney*—Melvin Pearson Williams

[57] ABSTRACT

Flowing gas laser systems of a variety of configurations, including exemplary $CO_2$—$N_2$—He systems, are provided with a critical amount of relaxant gas, determined by maximum differential between the upper and lower laser levels of the lasing gas for a given rate of excitation of the upper laser level, a mass flow suitably high to convect the heat away from the optical gain region causing the temperature of the optical gain region to be maintained suitably low that the equilibrium population of an upper energy state of a limiting self-relaxation process between the lower laser level and ground is maintained less than the significant fraction of the total lasing gas population. Increased mass flow, resulting partially from increased pressure, provides increased losses within the electric field region where the upper laser level is excited through electron collisions, the increased losses permitting operation with a higher electric field, with higher electron densities, and with increased pressure, thereby permitting operation at an optimum ratio between electric field to neutral particle density with a higher electric field.

45 Claims, 15 Drawing Figures

HIGH-PERFORMANCE GAS LASER

BACKGROUND OF THE INVENTION

1. Field of Invention

This invention relates to devices employing collisional and plasma physics, and more particularly to high-power flowing gas lasers.

2. Description of the Prior Art

Gas lasers known in the art are limited in a significant fashion in the maximum power, power density (per volume), and specific power (per unit mass flow), and, to some extent, in efficiency and gain by the inability of the laser apparatus to extract the excess heat or power supplied to the gases in the optical gain region without a commensurately high-temperature increase in the working fluid. The increase in temperature increases the equilibrium population density of lower energy states of the lasing gas, relative to the ground state, thus inhibiting the process of relaxation of these states to the ground state. The magnitude of this problem is illustrated by considering, as a typical example, these effects in a carbon dioxide laser. The quantum efficiency of carbon dioxide is approximately 41 percent. Thus, each unit volume of lasing gas raised to the upper laser level (001) will deliver only 41 percent of its energy in the form of coherent electromagnetic radiation (useful optical output). The remaining 59 percent of the energy in the upper laser level is transferred to lower energy levels, ultimately taking the form of heat and increasing the temperature of the gases in the optical gain region unless it is effectively removed therefrom. The temperature of gases in the optical gain region determine the equilibrium population density thereof. The population of lower energy states of a lasing gas can never be made lower than the equilibrium population density at any given temperature through kinetics, and therefore an increase in temperature limits the minimum population of these lower states. In turn, this imposes a limitation on the differential between the upper laser level and the lower laser level, which controls the optical power and gain characteristics of the laser. Thus, in a volume of gas, quantum efficiency alone dictates that any attempt to increase optical power output is at least partially thwarted by the amount of power converted into waste heat, which results in a further increase in the temperature of the working gases. As used herein, "optical" refers to electromagnetic radiation at wavelengths including ultraviolet, visible and infrared radiation.

The process of relaxing the lower laser level to ground is significantly hampered if it includes a limiting self-relaxation process between a lower laser level and the ground state with a rate substantially slower than the rate at which the lower laser level is populated by stimulated photon emission. Such is the case in lasers employing carbon dioxide, since the 010 level thereof has a relaxation rate which can be orders of magnitude slower than the rate at which the lower laser level may be filled when the laser is operated at high-power levels. Therefore, the 010 level fills rapidly from the lower laser level, and once the 010 level achieves a population as high as that of the lower laser level, the population in the lower laser level increases rapidly until there is no longer a sufficient excess of population in the upper laser level (population inversion) and laser operation is severely lessened or ceases altogether.

The problem is further compounded by the fact that, although the lower laser level in the lasing gas (such as the 100 level of carbon dioxide) may have an equilibrium population suitably low at typical operating gas temperatures, relaxation of the lower laser level to the ground state may depend on a process having an upper energy state (such as the 010 level of carbon dioxide) having an equilibrium population density at laser-operating temperatures very nearly equal to the steady-state population of the upper laser level. If the limiting state (such as 010 of $CO_2$) is allowed to reach a steady-state density which is nearly equal to the steady state upper laser level density, even though the rate of removing particles from the lower energy state is as high as the rate at which the lower laser level is being filled by lasing from the upper laser level. The achievable population inversion can be so small as to severely limit useful optical output. Thus, not only the rate, but the population as well, must be properly accommodated.

To overcome the foregoing problems, prior laser devices employ a relaxant gas to enhance the relaxation rate of states below the upper laser level, in an attempt to achieve a steady state condition including a high rate of photon emission and commensurately high rate of relaxation of lower states to the ground state. For instance, in carbon dioxide lasers, resonant relaxation with water vapor molecules has been utilized with some degree of success. Also, wide usage of helium as a relaxant has occurred. However, lasers of the prior art, which have been believed to achieve increased power through the use of diluents or relaxant gases, have in fact not exhibited sufficient improvement as a result of selective depopulation of the lower laser level at higher power output levels, but rather have provided a significant depopulation of the upper laser level along with the lower vibrational states. In fact, as is described in accordance with our invention hereinafter, we have found that improvement in laser operation, observed in prior devices as a result of increasing use of relaxant gas, is due to the fact that such devices are lower level saturation dominated, and thus are improved by the cooling effect of the relaxant gas (particularly in the case of helium, which has a high specific heat) even though a significant nonproductive relaxation of the upper laser level occurs.

The use of excess relaxant gas lowers the efficiency of the device because upper laser level relaxation results in no useful optical output and causes still further heat to be generated per photon of useful output. This heat causes additional difficulty in maintaining a sufficiently low temperature to provide lower state equilibrium population densities much lower than the densities of the upper and lower laser levels which result from electrical excitation and photon emission. It also tends to reduce the net rate of relaxation of the lower energy states to the ground state. Thus, use of excess relaxant gas, although it can improve power output of a system severely dominated by excess low-level population, degrades the power potential of the laser and results in only marginal improvement in actual power output due to upper laser level energy which is converted directly to heat through rapid relaxation by the relaxant gas.

In some instances, gas lasers of the prior art operating in a low-power regime have been reported to have reached a relatively effective balance between wall losses, losses due to transportation of heat by conduction and convection through the gas within the optical gain region, and the amount of relaxant gas utilized. Such devices, however, have in fact exhibited power increases only within an order of magnitude. As is described in more detail hereinafter, this has been found, in accordance with the present invention, to have resulted from failure to accommodate effects that various changes in kinetics may have on the electric excitation region of the laser; that is, attempts to accommodate the effective temperature requirements of the optical gain region through adjustments in gas flow severely alter the process of excitation of upper laser levels through electron collisions in an electric field.

SUMMARY OF INVENTION

An object of the present invention is to provide a gas laser having improved maximum power, power density, and specific power characteristics.

Another object of the present invention is to provide a gas laser having improved efficiency and gain characteristics at any power level.

The present invention is predicated in part on our discovery that gas lasers of the prior art suffer severe penalties in power generation as a result of the use of excess relaxant gas in attempts to overcome domination by excessive lower level populations. More specifically, the invention is predicated on our discovery of the fact that use of a critical amount of relaxant gas can substantially improve operation of any gas laser. We have discovered that, for any gas laser dependent on equilibrium limitations to relaxation processes, there is a temperature, which if exceeded in the optical gain region, will absolutely preclude significant laser operation; further, lasers known to the prior art have been operated with the gaseous bath in the optical gain region too close to the critical maximum temperature at which laser operation is virtually impossible. We have further discovered that the elimination of lower level population domination in operation of gas lasers can be achieved only to a certain extent with laser kinetics, which have been useful only when operating with laser output power commensurate with the capability of a laser for heat transfer through the walls of the laser chamber, sometimes in conjunction with a limited gas flow heat extraction, or under conditions which reflect significant reduction in the upper laser level population as a result of employing excess relaxant gas; in other cases, the temperature increases as a result of relaxing a large number of lasing gas particles into rotational and translational states without sufficient heat extraction, which results in the energy transfer from the lasing gas to the relaxant gas being little if any greater than the energy transfer from the relaxant gas to the lasing gas; thus, the relaxant gas becomes ineffective in depopulating lower levels of the lasing gas. This results in a significant limitation on the amount of total effective depopulation of the lower laser level which can be achieved by the so-called "selective" depopulation heretofore attributed to the use of relaxants, which has in fact been observed only in low-power density lasers, and only to a limited extent.

We have further discovered that the use of a proper amount of relaxant gas significantly affects total laser operation because the ratio of the rate of relaxation of lower energy states to the rate of relaxation of upper energy states may vary with temperature. If just sufficient relaxant is utilized, with a cooling of the optical gain region by other means, such as total mass flow (not having excess relaxant gas), then the selectivity of the relaxation of the lower states compared to the upper laser level is enhanced, thus improving total efficiency and aiding heat extraction, at a suitably low temperature, from the equilibrium bath of gases within the optical gain region.

Our invention is further predicated on the discovery that initial increases in power output as a result of increases in mass flow in lasers known to the prior art are lost by failure to adjust the parameters of the electric field region to compensate for the effects of high mass flow. Our invention is predicated in part upon our discovery that failure to realize important power increases as a result of temperature decreases in the gaseous bath of the optical gain region is in significant part due to increased losses in the region of the electric field, as a result of high gas flow, particularly when a gas having a high specific heat (such as helium) flows through the electric field region. The increase in losses significantly alters the magnitude of the electric field and causes a corresponding alteration in the ratio of the electric field to the neutral gas density therein. This in turn causes a greater proportion of the electrical input power to be allocated to electronic and other undesirable levels of excitation, rather than levels of excitation useful for optical output in the lasing gas and/or an additional gas used to promote upper laser level excitation. We have discovered that, by operating gas lasers with a concomitant increase in pressure, rather than at low pressure and high velocity, not only can the original useful laser level production capability of the laser be restored, but, in accordance with our invention, the increased mass flow and pressure with a properly adjusted electric field will result in a still higher production of excited particles which can participate in useful optical output.

According to the present invention, in a multigas laser of the type in which optical output power is extracted in a region of optical gain from an upper laser level of a lasing gas having a limiting self-relaxation process between a lower laser level and the ground state with a rate substantially slower than the rate required for a high rate of stimulated photon emission, and in which electrical input power is coupled into gas flowing in the laser through electron collisions in an electric field, the gas flowing through the region of optical gain includes an amount of relaxant gas substantially equal to that which provides combined relaxation processes which, together with stimulated photon emission, provide maximum differential between upper and lower laser levels for any given rate of excitation of the upper laser level, and a total gas mass flow rate to provide, throughout the region of optical gain, population of said upper energy state less than a significant fraction of the total population of the lasing gas; in further accord with the present invention, there is provided in the electric field region, the maximum electron density below that which promotes localized arc initiation at the pressure required for said mass flow rate.

Our invention permits significant increase in the maximum power obtainable in any gas laser. In fact, application of the principles of the present invention to gas lasers has resulted in not less than a fivefold improvement and has resulted in most cases in improvement by several orders of magnitude.

The foregoing and other objects, features and advantages of the present invention will become more apparent in the light of the following detailed description of preferred embodiments thereof as illustrated in the accompanying drawings.

DESCRIPTION OF THE PREFERRED EMBODIMENT

Figure 1:
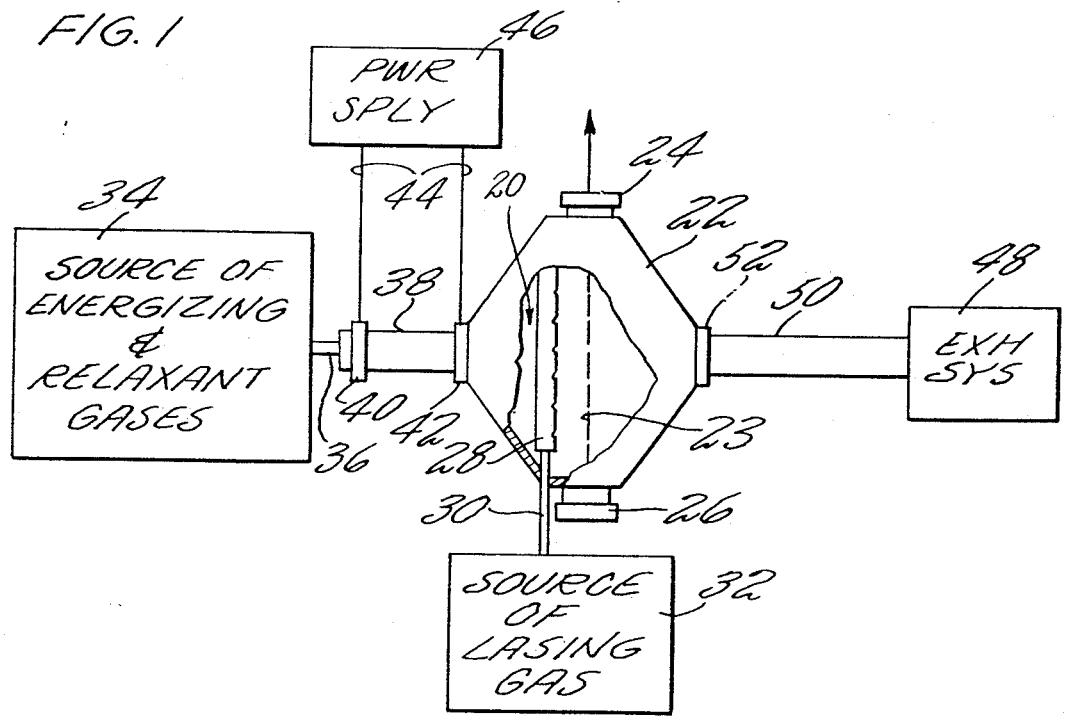
FIGS. 1–6 are simplified schematic diagrams of exemplary flowing gas laser configurations within which the present invention may be practiced.

FIG. 1 is a simple schematic illustration of a flowing gas laser of the mixing type, as disclosed in a copending application of the same assignee entitled GAS LASER, Ser. No. 710,696 filed on Feb. 23, 1968, by Pinsley and Brown. A laser chamber 20 includes a wall structure 22 having an optical gain path 23 which may comprise either an amplifier or an oscillator; if an oscillator, the optical gain path is formed by a pair of mirrors 24, 26; the mirrors may be replaced by windows so as to form a single-pass amplifier, or by windows and a series of mirrors so as to form a multipass amplifier, as is known in the art. Within the laser chamber 20, a spray bar 28 may inject lasing gas applied thereto over a conduit 30 from a source of lasing gas 32. The laser chamber 20 also receives energizing gas and relaxant gas from a source 34 connected by a conduit 36 to an electric discharge chamber 38. The electric discharge chamber 38 has a pair of electrodes 40, 42; the electrode 42 may also comprise a suitable gastight clamp to allow juncture of the electric discharge chamber 38 with the laser chamber 20. The electrodes 40, 42 are connected by wires 44 to a suitable high-voltage DC power supply 46. On the other hand, electric excitation may be provided instead by AC or RF excitation, as is known in the art. A gas flow may be maintained through the laser chamber 20 in response to an exhaust system 48 connected thereto by a conduit 50 disposed in fluid flow relationship with the chamber 20 by a suitable clamp or other connection means 52. The exhaust system 48 includes a gas pump or suitable volumetric capacity at appropriate pressure, temperature and velocity. In this configuration, the total flow is comprised of the flow from the sources 32 and 34, but only the flow from the source 34 affects the electric discharge, provided that the exhaust system 48 has sufficient capacity so as to accommodate the flow from both sources and the pressure does not vary. It should be noted that a significant feature of the mixing configuration as shown in FIG. 1 is that excitation of the energizing gas can be achieved remotely from the optical gain path without the danger of the useful laser energy being dissipated prior to reaching the optical gain path since the lasing gas is introduced directly in the optical gain region. This is particularly true in a nitrogen-carbon dioxide laser wherein the relaxation times of the first vibrational state of nitrogen are extremely long and substantially all of the vibrationally excited nitrogen will reach the laser gain path area even though the electric discharge is located some fraction of a meter upstream therefrom.

Figure 2:
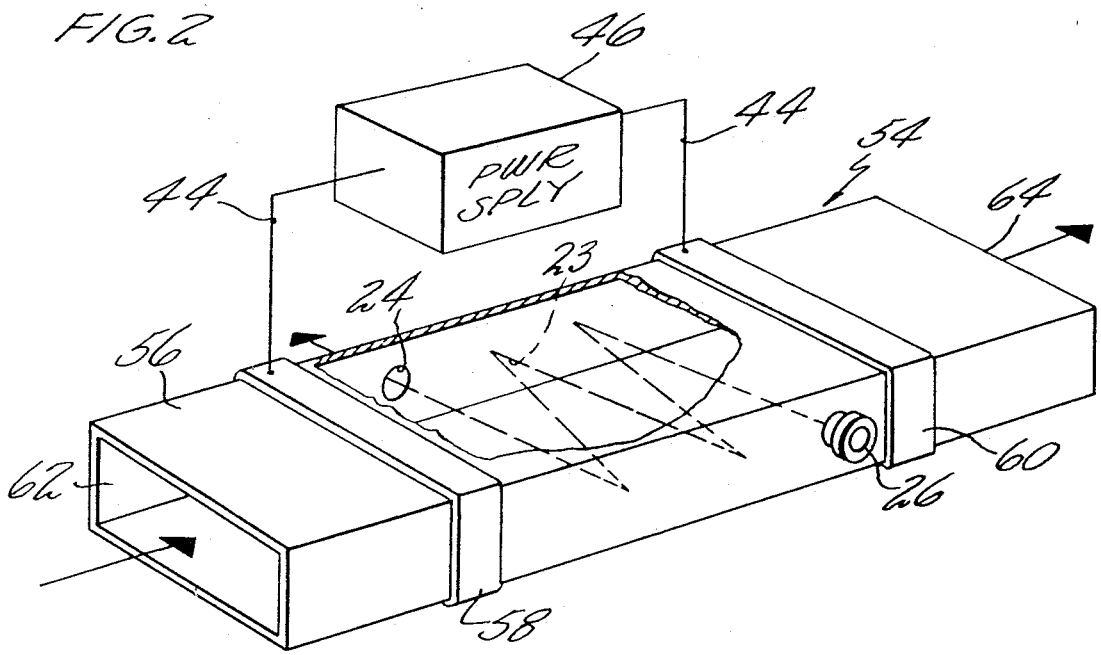

A nonmixing, or premixed counterpart of the configuration of FIG. 1 is illustrated in FIG. 2. This is sometimes referred to as a "crossbeam" configuration. Therein, the laser gain path 23 is located within a laser chamber 54 comprising a conduit or duct assembly 56 having mirrors or windows 24, 26 appropriately disposed thereon. The power supply 46 is connected by wires 44 to suitable DC electric discharge electrodes 58, 60 which are displaced axially with respect to flow on opposite sides of the optical gain path 23. The configuration of FIG. 2 is schematic only, illustrating premixed flow with an axial electric discharge and a transverse, multiple optical gain path. In this case, all of the gases flow into the upstream end 62 of the conduit 56 and flow out of the downstream end 64. The inlet gases are premixed, including at least a lasing gas and a relaxant gas, and possibly an additional gas to promote excitation of the upper laser level of the lasing gas through electron collisions (such as $N_2$, in a $CO_2$ laser). Prelasing is avoided since excitation of any of the gases does not take place except within proximity of the optical gain path 23, since the electric discharge region and the optical gain region are substantially coextensive.

Figure 3:
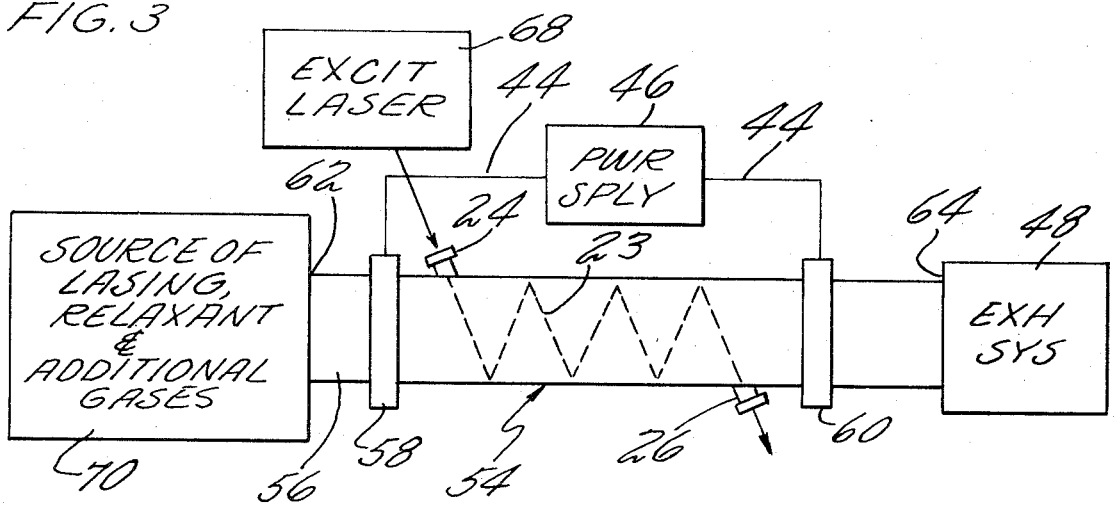

The configuration of FIG. 2 may be implemented in an amplifying configuration as shown schematically in FIG. 3. Therein, the optical gain path 23 is between a pair of windows 24, 26 that define an optical amplification path, receiving electromagnetic radiation from an excitation laser 68 through the optical window 24, and transmitting amplified electromagnetic radiation outwardly through the window 26. A source of lasing, relaxant and additional gases 70 is connected to the inlet end 62 of the conduit 56, and the exhaust system 48 is connected to the outlet end 64 of the conduit 56. The embodiments of FIGS. 2 and 3 may be implemented in a variety of manners, including rounded tube chambers 54 or chambers of polygonal cross section. In either case, the bulk of the power input is electrical power applied by the power supply 46 into the electric discharge formed between the electrodes 58, 60; in the embodiment of FIG. 3, additional power (although usually quite small) is introduced into the optical gain region by the excitation laser 68.

Figure 4:
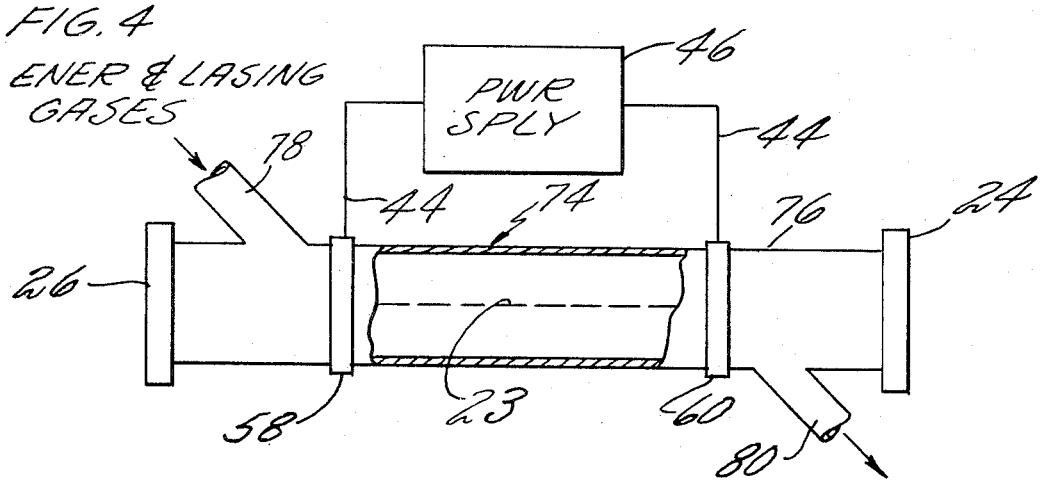

A slightly different configuration is illustrated in FIG. 4 wherein the laser chamber 74 is comprised within a tube 76 having a gas inlet branch 78 and a gas outlet branch 80, with the mirrors 24, 26 disposed on opposite ends thereof. The optical gain region exists only within the electric field region between the electrodes 58, 60. The configuration of FIG. 4 is therefore a completely coaxial configuration, with the flow, optical gain path 23, and electric discharge all axially aligned. Obviously, the configuration of FIG. 4 may be modified so as to include a multiple-pass optical gain path as in the embodiment of FIG. 3. In the configuration of FIG. 4, all of the flow enters the inlet branch 78 and passes through the electric discharge region between the electrodes 58, 60.

Figure 5:
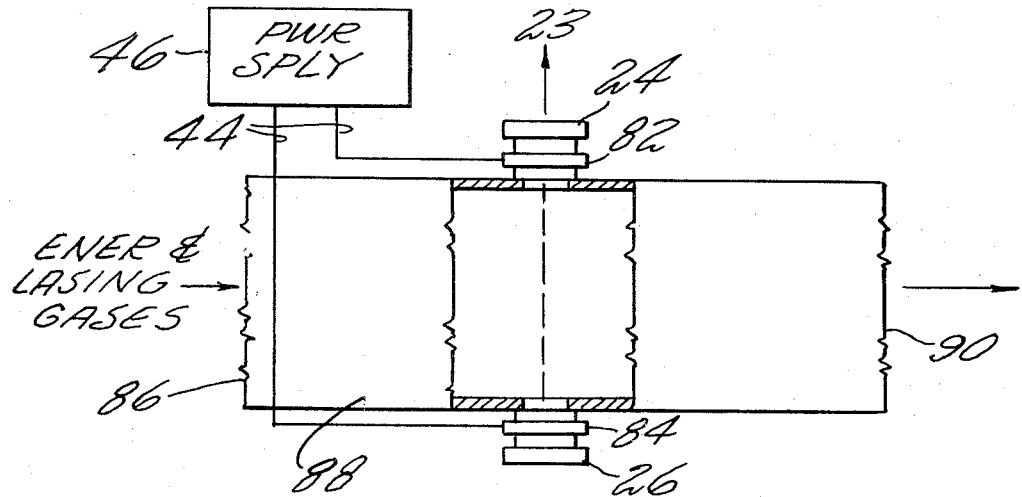

A different modification of the configuration of FIG. 2 is illustrated in FIG. 5. Therein, the optical gain path 23 is transverse to the flow of gases, and the optical gain region as such exists only between the mirrors 24, 26 due to the fact that electrodes 82, 84 are axially aligned with the optical gain path 23, transverse to the flow. The gases enter an upstream end 86 of a conduit 88 and exhaust through a downstream end 90 thereof. This embodiment differs from previous embodiments in that the axially aligned electric discharge and optical gain path are both transverse to the flow. All of the mass flow passes through the electric discharge region, as in the configurations of FIGS. 2 through 4.

Figure 6:
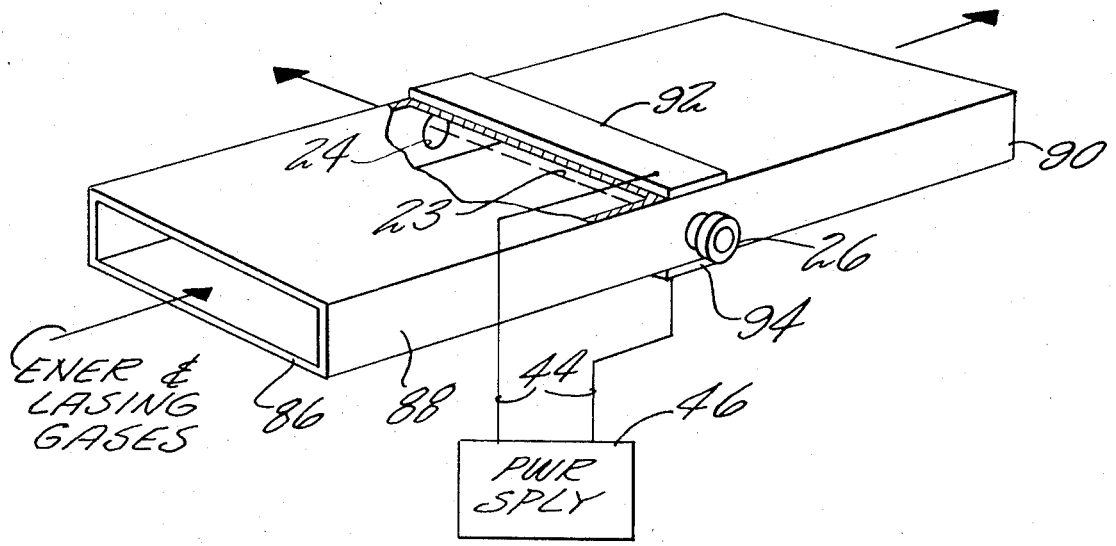

A modification of the configuration of FIG. 5 is illustrated in FIG. 6, wherein a pair of electrodes 92, 94 are located not only transversely with respect to optical gain path 23. Again, all of the mass flow passes through the electric discharge region between the electrodes 92, 94.

In the configurations of FIGS. 4 and 5, the illustration has been simplified by the elimination of electric discharge stabilization means, useful in high-power, high flow, or large embodiments which may, for instance, take the form illustrated in a copending application of the same assignee entitled CROSS FIELD ELECTRIC DISCHARGE CW LASER, Ser. No. (UAC Docket No. R-1381), filed on even date herewith by Bullis and Penney. However, the application of such stabilization techniques to the configurations of FIGS. 4 and 5 herein does not affect practice of the present invention; the only significant factor is that consideration must be given to principles of the present invention, including the effect of differing mass flows through the electric discharge and optical gain regions. The invention may also be practiced in closed loop configurations wherein the exhaust system returns the gas to the laser inlets.

OPTICAL GAIN AREA-ENERGY CONSIDERATIONS

Figure 7:
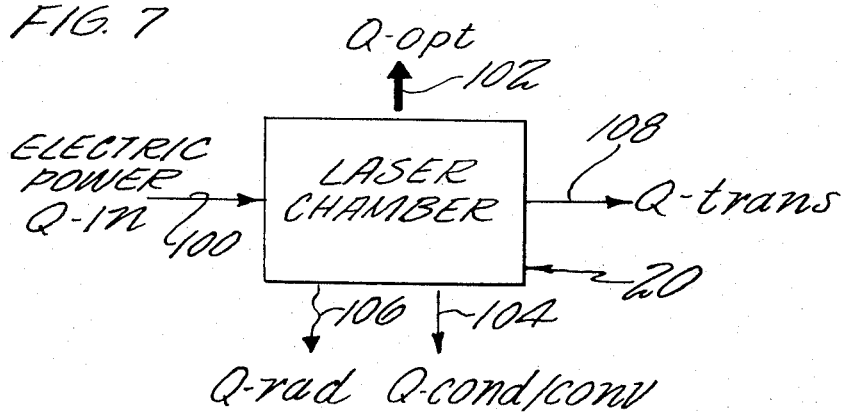
FIG. 7 is a schematic illustration of energy transfer with respect to a laser chamber.

As described hereinbefore, the present invention is predicated on the concept that flowing gas laser systems of the prior art have not reflected adequate consideration of gas kinetics in the optical gain region, and the effect thereon within the region of the electric discharge. Referring to FIG. 7, the laser chamber 20 is schematically illustrated as receiving electric power 100 into the laser chamber, which can be considered to be an equivalent input of heat flow (Q-in), and having various equivalent power extraction factors which can all be considered equivalent to heat outflow. The most important consideration is the laser's useful optical output power 102 which may be considered an optical heat outflow (Q-opt). In the prior art, flowing gas lasers rely predominantly upon wall losses for the extraction of power not available as optical power output. These wall losses occur as a result of radiation, conduction and convection of heat from the gases within the region of the optical gain path to and through the walls of the laser chamber 20, and into the ambient volume surrounding the laser chamber 20. In some prior instances, the walls of the laser chamber 20 have been water cooled, but the marginal improvement in output power demonstrates the inadequacy of heat transfer through the gas to the walls. Whether or not additional heat transfer is utilized at the laser chamber 20, heat removal therefrom is necessarily in the form of conducted/convected heat (104 Q-cond/conv) and heat radiated from the laser chamber or its outer most heat-exchange wall (106, Q-rad). Naturally, all further heat dissipation must be in the form of heat transported from the optical gain region (108, Q-trans) in the flowing gases. So long as the optical power to be extracted from a laser remains on the same order of magnitude as the heat dissipation capacity of a laser chamber 20 to dissipate radiative, conductive and convective heat through the walls of the chamber 20, then the heat-transportation capacity of the flow remains relatively immaterial to operational results of the laser. Since all power introduced into the laser chamber 20 must be extracted from the laser chamber 20 in a steady-state operation (which is reached rather quickly in CW laser operation), the temperature of the gases will increase until a steady-state temperature is reached which provides a sufficient temperature differential to dissipate the necessary power. Thus, if an external coolant is applied to the walls of the laser chamber, it will naturally dissipate a given amount of heat at a lower temperature than it will if the walls of the laser chamber are in a warm ambient. Similarly, if the heat which may be transported from the area of the laser gain path in the form of energy states of the various molecules in a gas mixture is significant with respect to the amount of power input, a similar effect is reached. However, the effect of transporting heat through suitable convection of gas is more marked in that it does not require diffusion of energized gas particles to the walls and is therefore not subject to poor heat transfer through the gas to the walls. It becomes apparent that the ability of a flowing gas laser to extract waste power is enhanced, particularly when the amount of waste power far exceeds the power dissipating capacity of the laser chamber, by a significant transportation of heat residing in the gases.

Figure 8:
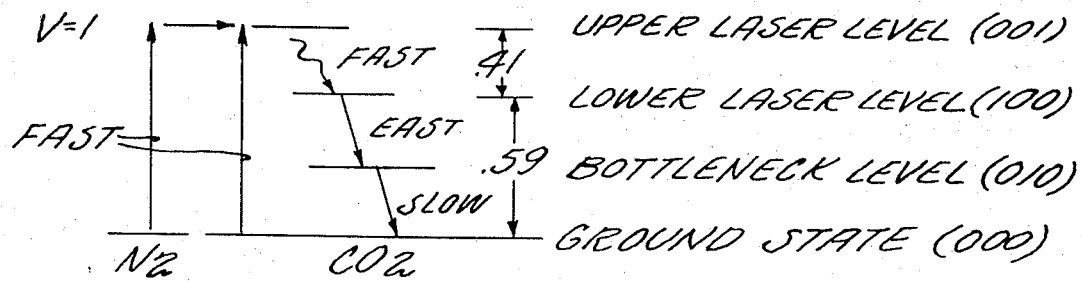
FIG. 8 is an energy level diagram illustrating the vibrational states in nitrogen and carbon dioxide.
Figure 12:
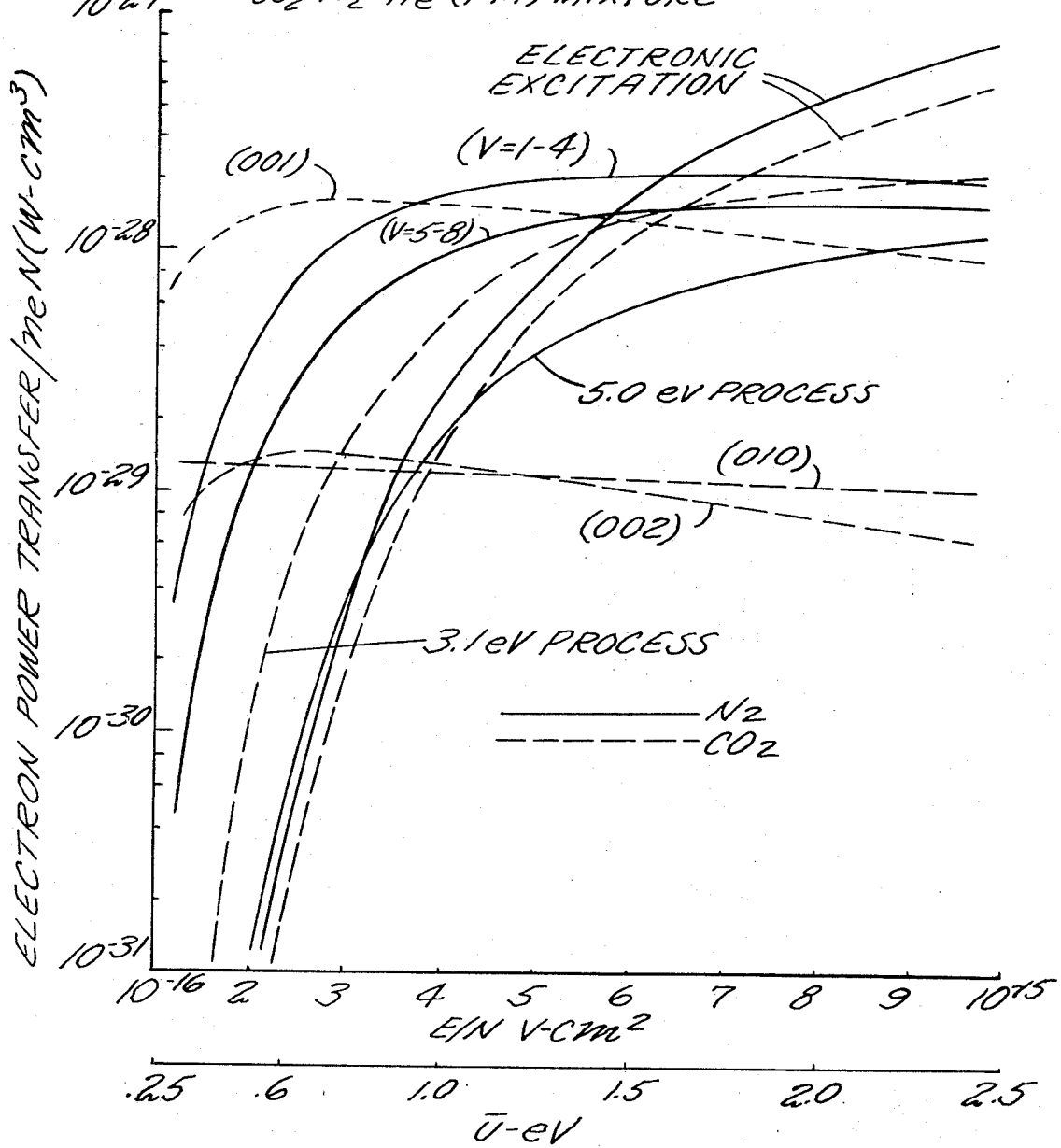
FIG. 12 is a chart of the rate of electron power transfer to the various collisional channels in the electric discharge of a laser employing a 1:1:1 mixture of $N_2$, $CO_2$ and He as a function of the electrical field to neutral gas density ratio (E/N)

The foregoing considerations become extremely important due to the quantum efficiency associated with gas lasers. Although the electric discharge type of gas laser is one of the most efficient types thereof, the quantum efficiency of carbon dioxide, for instance, (as illustrated in FIG. 8) is about 41 percent. This means that for every 41 watts which is extracted as optical power, about 59 watts has to result in waste thermal power which, if not extracted at a suitable rate can only result in a significant increase in gas temperature. A typical efficiency of optical pumping in nitrogen-carbon dioxide electric discharge lasers is on the order of magnitude of 50 percent, as illustrated in FIG. 12, hereinafter. Combining these two efficiencies, it can be said, for purposes of discussion and illustration herein, that electric discharge lasers known to the art have a total working efficiency of approximately 20 percent. Thus, of all the power inserted into the laser, on the order of 80 percent must be extracted substantially in the form of heat. It becomes apparent, therefore, that as optical power output increases from the order of magnitude of kilowatts or less to the order of magnitude of tens of hundreds of kilowatts, the power-dissipating capacity must accordingly increase on the order of magnitude of hundreds or thousands of kilowatts. Thus, the capacity for extracting other than optical power from the gases in the region of the optical gain path requires far more attention than it has received in the prior art.

LIMITATIONS ON OPTICAL GAIN REGION KINETICS

Figure 9:
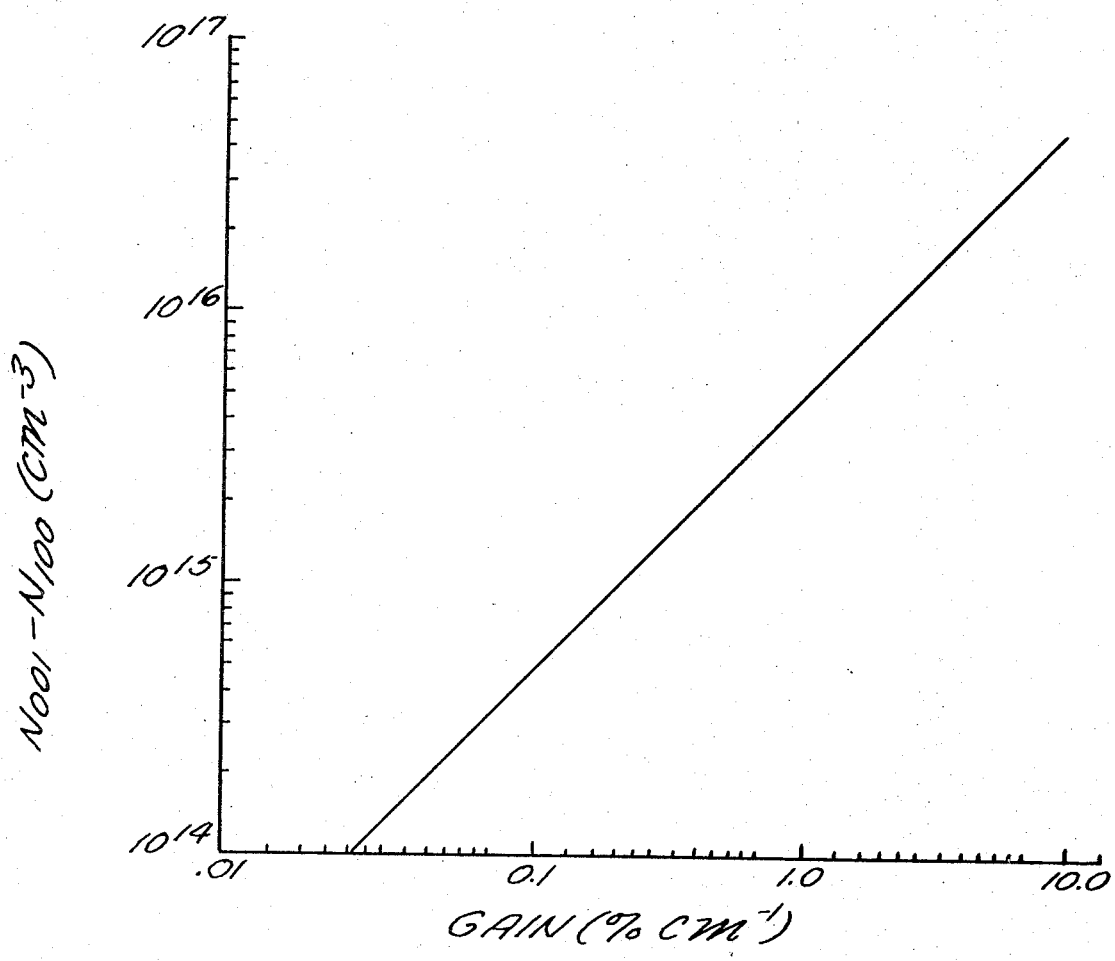
FIG. 9 is a log—log plot of gain as a function of laser level population inversion.
Figure 10:
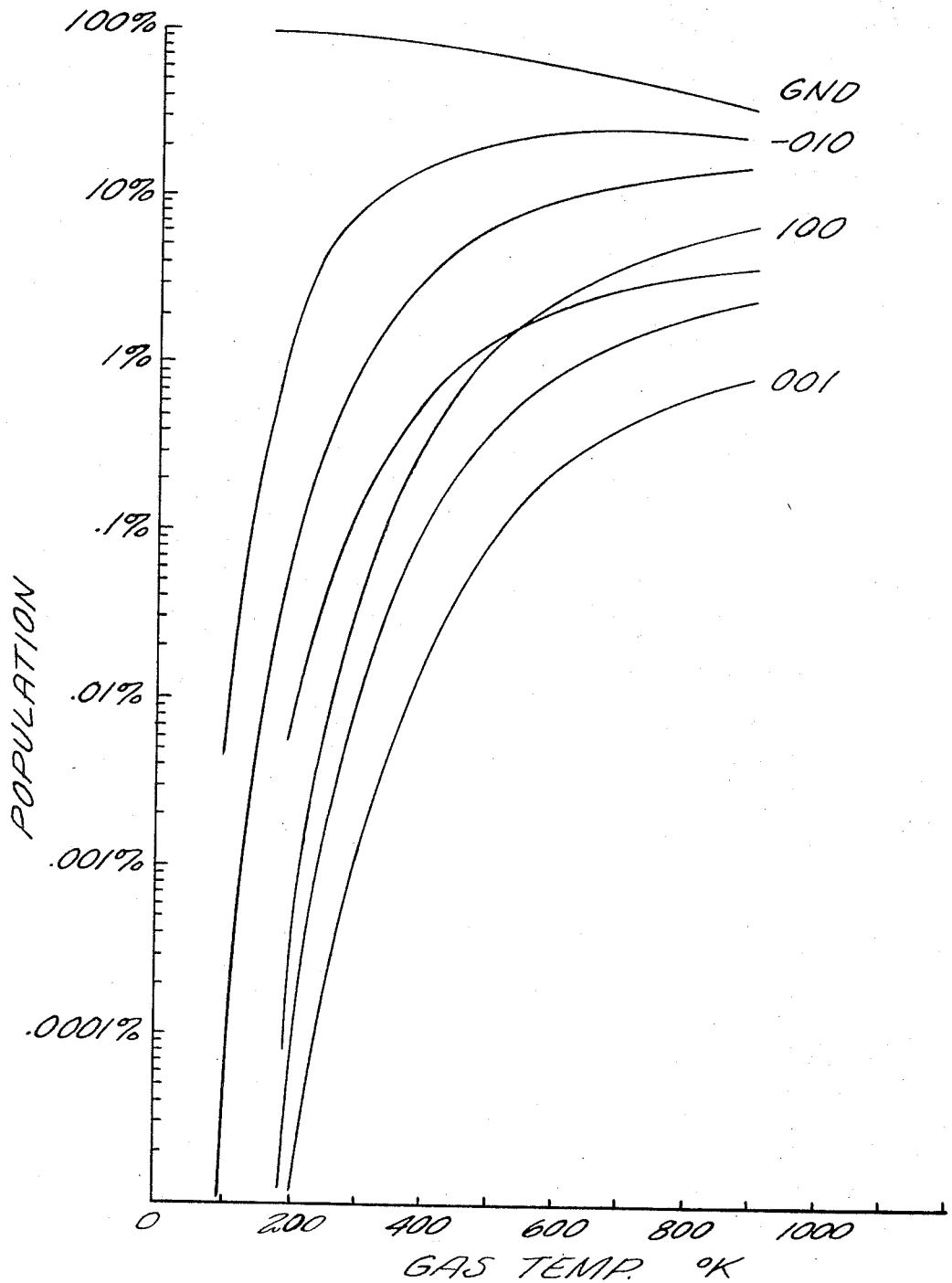
FIG. 10 is an equilibrium population density chart for carbon dioxide.

As described briefly hereinbefore, it is known in the art that the maximum output power, maximum power density, specific power (that is, power per unit mass of gas flow), gain and efficiency, are all related to population inversion as illustrated in FIG. 9. This requires both the ability to create population inversions in the lasing gas as a result of electrical power input, and the ability to maintain suitable population inversion between the upper laser level and lower energy states of the lasing gas in steady-state operation in order to promote energy transitions as a result of photon emission, rather than through relaxation processes. The temperature of the gas in the optical gain region, which can rise rapidly if suitable power dissipation is not supplied (as described hereinbefore), is extremely significant in terms of the ability to maintain suitable population inversion, as is illustrated with respect to FIGS. 10 and 11. FIG. 10 is a chart illustrating relative fractional equilibrium population densities for carbon dioxide, from temperatures of 200° to 900° K. It can be seen that, in equilibrium, the population of the upper laser level (001) is miniscule up to temperatures of about 500° K., where it represents only one-tenth of one percent of the total population. The population of the lower laser level (100) is an order of magnitude higher at this temperature, being about 1.7 percent. The bottleneck level of $CO_2$ (010) is again an order of magnitude higher, being about 20 percent at around 500° K. The fractional population of the ground state, on the other hand, goes from nearly 100 to about 70 percent at 500° K., and 37 percent at 900° K.

Figure 11:
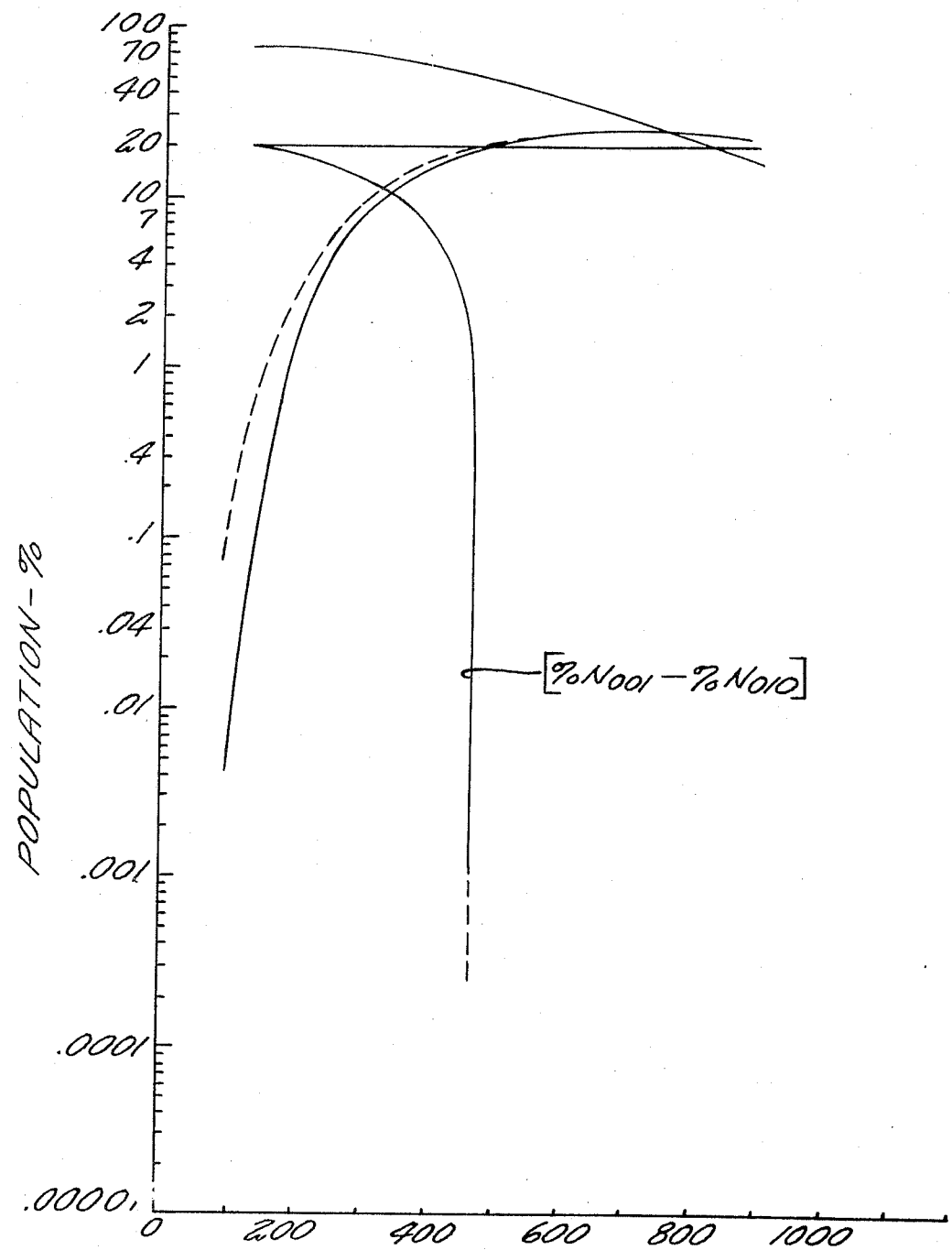
FIG. 11 is a population density chart for carbon dioxide with appropriate adjustments illustrating conditions which obtain during laser operation.

The significance of fractional equilibrium population density in the lasing gas (carbon dioxide) is illustrated more clearly in FIG. 11. Therein, several assumptions are made, and are presented as a first approximation of conditions which can be expected to be potential end points, or limitations, on high-power density, high-power laser operation. The assumptions are based on actual, empirically determined parameters which obtain in one given flowing $CO_2$—$N_2$—He laser of the mixing type, similar to the configuration illustrated in FIG. 1 herein, when operated in accordance with the present invention. This figure is typical for mixing configurations operated in accordance with the teachings herein. In that particular system, under those operating conditions, it was determined, by assuming an optical cavity of 100 percent efficiency, with no mirror losses, that 20 percent of the carbon dioxide was raised to the 001 level directly and through near-resonant vibrational collisions with molecules of nitrogen in the first vibrational level. FIG. 11 illustrates this by plotting the fractional population density of the upper laser level at a flat 20 percent. This is approximately true, at least up to about 500° K., in a mixing configuration. However, the rate of excitation of the upper laser level depends on a collisional process which is a function of the population density of the ground state. As the equilibrium population of the ground state (000) decreases markedly with temperature, so does the rate of exciting the upper laser level. This is not a loss factor, since the energy is conserved in the electrons, and can again be given over to a particle of lasing gas in the form of upper laser level excitation. But this does limit the power that can be placed into upper levels and will cause the electric field to be self-limiting at some value. In the case where the optical gain region is coextensive with the electric field region, as in nonmixing, or premixed configurations, steady-state conditions of high optical output power further compound the problem by depleting the ground state population in favor of lower laser level population. In premixed configurations, the rate of excitation of the upper laser level is thus more sharply reduced with increasing temperature. However, for comparative purposes herein, FIG. 11 does provide a meaningful illustration of the limits which the optical gain region temperature imposes on laser operation.

As is known in the art, and illustrated in FIG. 8, the rate of energy level transition from the 100 level through the 020 level and directly into the 010 level is extremely fast: many orders of magnitude faster than the rate of relaxation from the 010 level to the 000 level. As seen in FIG. 10, the 010 level has an equilibrium population density roughly an order of magnitude higher than the 100 level. At high optical power densities, the steady-state condition, while lasing at a high-power rate, results in the 100 level being at roughly the same population as the 010 level, since it will tend to relax to the 010 level as quickly as the 010 level relaxes to the ground state, thus keeping the population of the 010 level at least at its thermal equilibrium population, or higher. A first point to notice is that, even though the upper laser level (001) is considered to lase quickly into the lower laser level (100), and the lower laser level has a much lower thermal equilibrium population than the bottleneck level (010), since the bottleneck level is so slow in relaxing, the net effect is to cause a steady-state fractional population of the 100 level to increase to a level which approaches the 010 level and therefore is much higher than its normal thermal equilibrium level. This is obviously a step in the wrong direction in terms of maintaining a high population inversion between the 001 level and the 100 level. A second point to notice is that the very best that can be expected of the gases in the optical gain region under lasing conditions is that the 010 level will be at a fractional population density which is no less than that which is shown in FIG. 11 for thermal equilibrium, and since the 100 level follows it, the lower laser level will reach a fractional population density substantially equal to the 010 level, thus precluding any possibility of lasing at temperatures above about 490° K. (in the exemplary system which FIG. 11 approximately illustrates). As previously indicated, one exemplary laser, operating at a moderately high optical output power, but not in accordance herewith, was found to be operating at a temperature of 475° K. The significance of relatively lower difference between populations of the two states is known in the art to result in a lower optical power emission density (fewer photons per potential lasing gas molecule).

Specifically, it is known that the gain ($\alpha$) of a laser can be expressed as a first approximation as $$\alpha = \sigma(N_{001} - N_{100}), \quad (1)$$

where $\sigma$ is the cross section for stimulated photon emission, as known in the art. This is plotted in FIG. 9, which illustrates useful gain above differentials of $3.5 \times 10^{15}$. A high gain (about 10) is possible with a $CO_2$ pressure of only 1 torr, under conditions in accordance with the present invention. However, since it is known that the lower laser level (100) rapidly fills, and assumes substantially the dynamic steady state population density equal to that of the bottleneck level (010), a first order approximation of gain may be expressed, in a laser operating under maximal conditions in accordance with the present invention, as follows:

$$\alpha = \sigma(N_{001} - N_{010}). \quad (2)$$

The factor ($N_{001} - N_{010}$) is plotted in FIG. 11, and is an indication of the effect of temperature on gain. Notice that this factor changes by an order of magnitude between ambient temperature (273° K.) and about 470° K., just below the temperature (475° K.) previously referred to which was found to exist in a configuration capable of practicing the present invention when it was adjusted, however, for operation in accordance with the prior art. At 475° K., this factor is rapidly approaching zero. Of course, the factor described here is of little moment since it is the number density differential between the two laser levels rather than their fractional differential which has any meaning. So long as the fractional differential is positive, then an increase in pressure provides further increase in the differential in number density between the upper and lower laser levels. It does indicate, however, that above a certain temperature the differential will no longer be positive, so any increase in pressure cannot possibly create a favorable power output situation.

The use of a relaxant gas (such as helium for relaxing carbon dioxide) increases the rate of depopulating any given state thereof; further, this rate is known to be greater for the lower levels of carbon dioxide than it is for the upper levels: thus, it is thought to be "preferential" and therefore extremely useful in maintaining a low fractional dynamic equilibrium population of the lower state of the lasing gas. In fact, the effect of helium in relaxing the 010 level is roughly 24 times as great as its effect in relaxing the upper laser level at a temperature of approximately 400° K.; but this improves to approximately 40 to 1 ratio at a lower temperature, about 200° K. As just described, the fractional equilibrium population of the lower states increases markedly with temperature, and in fact approaches or exceeds achievable upper laser level fractional population at temperatures in the range in which prior art flowing gas lasers operate. However, consideration must also be given, in accordance with the present invention, to the fact that the rates of energy transfer from helium into the lower states, or from the ground state into the bottleneck level, are also a function of temperature; the higher the temperature, the higher the rate of the transfer process. An additional factor is that the rate of energy transfer is proportional to the density of molecules in the energy state which is to be depopulated, or populated by the process. As temperatures increase, population densities of all states other than the ground state increase (at least within the temperature range of significance to the present invention, as shown in FIGS. 10 and 11) and since under typical conditions the population of any state can never be less than its equilibrium population, no amount of any relaxant gas can possibly draw the population of the bottleneck level below its equilibrium population for the temperature of the gaseous bath within the optical gain region. The temperature of the bath must therefore be sufficiently low to permit an equilibrium population of the bottleneck level which is sufficiently less than the steady-state population of the upper laser level. It can be variously stated, independently of the upper laser level, as maintaining the bottleneck population at less than a significant fraction of the total population. This fraction becomes significant when, for any population of the upper laser level, the population of the bottleneck level is not sufficiently lower for high performance as described herein.

Another factor to be considered is that, in a mixture of carbon dioxide and helium, the overall rate of relaxing the 100 level is not affected by helium. In other words, the introduction of helium does not alter the premise that the bottleneck level is still the rate-limiting step in the process of relaxing the lower laser level; thus, as a first order approximation, it may still be assumed that the population of the lower laser level (100) will quickly assume very nearly the population of the bottleneck level (010) as illustrated in FIG. 11.

It is not alleged that all of the information in the foregoing analysis is completely novel; it is alleged, however, that designs of prior art lasers indicate the failure to take proper cognizance of this information. Further, the foregoing analysis demonstrates that the best that can be expected in a flowing gas laser is the establishment of steady-state fractional power densities (including the effects of pumping of an upper laser level, introducing heat into the thermal bath of a gas mixture in the optical gain region, rapidly filling the lower laser level and in turn the bottleneck level, and ending up with some equilibrium density of the bottleneck level), which, together with the dynamic fractional population of the upper laser level, will directly affect the maximum gain and power capabilities of the laser.

Referring again to FIGS. 7 and 8, it can be appreciated that with a quantum efficiency of about 41 percent for carbon dioxide, the amount of power which must be rejected to the bath for a given optical output becomes extremely high. Extraction of this power, other than through the walls of the laser, will be at a rate proportional to the temperature rise across the laser gain region, the effective specific heat of the gas mixture, and the quantity of mass flow per unit time, as follows:

$$Q = \dot{m} c_p (T_{out} - T_{in}) \quad (3)$$

where
 $Q$ is the rate of heat flow, or power extracted by the gas from the laser gain region
 $\dot{m}$ is the mass flow in pounds or moles per unit time
 $c_p$ is the effective specific heat of the gas mixture
 $T_{in}$ is the temperature of the gas as it enters the optical gain region and
 $T_{out}$ is the temperature of the gas as it leaves the optical gain region.

Obviously, if low temperatures are to be utilized in order to maintain the smallest possible dynamic equilibrium fractional population of the bottleneck level, the most effective way to increase the amount of heat extraction capability ($Q$) of the optical gain region is to increase the mass flow ($\dot{m}$) and the specific heat ($c_p$). Since the specific heat of helium is very high, the use of helium as a relaxant is most effective in achieving high-power extraction; also, increasing mass flow, not merely by velocity, but by an increase in pressure, in accordance with the present invention, can provide a significant increase in the power extracted from the region of the laser gain path. It is well at this point to consider the significant emphasis given in the literature and otherwise in the prior art to migration of lower states to the walls. Obviously, in the context of the present invention described thus far, this alludes to the transportation of these molecules to the walls, for the transfer of heat thereto. Also, it may be noted that marginal trends toward higher powers by means of excess use of helium have been due to increased heat flow as a result of the high specific heat of helium; but only marginal trends are reported due to the excessive relaxation of the upper laser level which has been the necessary consequence.

The present invention, by giving particular detailed attention to the cooling of the optical gain region, and the depopulation of the bottleneck level, also contrasts with pulsed lasers known to the art in which the bottleneck level is convected out of the optical gain region after one pulse and before the next pulse, without first being relaxed to a lower state. For CW operation, in many configurations (including mixing and premixed configurations), each $CO_2$ molecule is successively brought from the lower laser level to ground and is again excited to the upper laser level and used over again, many times, before flowing out of the optical gain region. Thus, it is advantageous to relax the lower laser level to the ground state so that the lasing particles can be used again, thereby enhancing the specific power of the laser. Additionally, we have found that the time it takes for a given particle, such as of a lasing gas, to flow from the upstream end of an optical gain region to a downstream end thereof, even in the case of a narrow oscillator or single-pass amplifier, is very much longer than the time it takes to relax the lower energy states (below laser transition) to ground. In other words, if one were to rely on transporting lower laser level particles out of the optical gain region, one can operate only with gas velocities many times the speed of sound, or in a pulsed mode in order to achieve interesting laser operation at high-power densities. On the other hand, by properly relaxing lower laser levels, and the levels in the processes upon which the lower laser level depends to reach ground, the rate of flow into the lower laser level before its population approaches that of the upper laser level can be many orders of magnitude higher.

As described hereinbefore, the attractiveness of helium, as a high specific heat gas, in helping to remove heat from the optical gain region has in fact been utilized so as to detract from maximum power operation of gas lasers, rather than to enhance high-power operation. This is due to the fact that the helium has been used in sufficient quantities to significantly depopulate, through relaxation processes, the upper laser level of the lasing gas. According to the invention, we have discovered that although the temperature considerations are paramount, the accommodation of temperature at the expense of the upper laser level is diliterious to maximum power operation. Further, in accordance with the invention, we have discovered that the amount of relaxant gas used in any flowing laser having a limiting process between the lower laser level and ground should be just sufficient to achieve a rate of relaxation of the upper energy state of the limiting process commensurate with the rate at which the state is being filled. This state of course is filled at a rate which depends on the other processes, including at least the rate of lasing, or stimulated photon emission, that fills the lower laser level, and the rate of direct relaxation of the upper laser level. In the case of carbon dioxide, and helium, the 010 level in carbon dioxide is the upper energy state of the limiting relaxation process, or bottleneck level. Thus, the amount of relaxant utilized should be just that amount which is necessary in order to increase the rate of relaxing the limiting state to ground a point which promotes a maximum excess of upper laser level population over lower laser level population, under high optical output steady state conditions. Total photon emission per unit time can be determined by measuring optical output power, thus:

$$\dot{n}=P_{out}/hY \quad (4)$$

where
$\dot{n}$ = the number of photons emitter per unit volume per second
$P_{out}$ = optical output power density
$h$ = Planck's constant
and
$Y$ = the line frequency of the lasing gas (the frequency of the electromagnetic wave of the optical output).

The rate of relaxing the limiting state is expressed:

$$R=N_L N_R Q_{RP} \bar{V} \quad (5)$$

where
$R$ = the number of particles relaxed per unit volume per second
$N_L$ = the number of particles, per unit volume of lasing gas particles in the limiting state
$N_R$ = the number of particles of relaxant gas per unit volume
$Q_{RP}$ = the cross section of the relaxation process involved
and
$\bar{V}$ = the average velocity of closing in a collision between relaxant and bottleneck particles.

Thus, in accordance with the present invention, one can express by combining equations (4) and (5) the relationship of relative proportion of relaxant and lasing gas in terms of stimulated photon emission as follows:

$$\dot{n}=R \quad (6)$$

and $$P_{out}/hY = N_L N_R Q_{RP} \bar{V} \quad (7)$$

or $$N_R = \frac{P_{out}}{h \nu N_L Q_{RP} \bar{V}} \quad (8)$$

By assuming a fractional number density for bottleneck levels (as in FIG. 11), the proportion of relaxant gas can be thus approximated to first order. A more accurate determination can be made by iterative simultaneous solutions of the rate equations for populating the various states of the lasing gas. The objective in selecting an amount of relaxant is to achieve the highest possible difference between the upper and lower laser level populations. From equations 9 through 12, or similar information in FIGS. 12 and 13, described hereinafter, it is possible to determine the rate of upper laser level excitation, by electron collisional processes in particles per second. Since the rate of photon emission is dependent upon optical flux, and optical flux depends upon density or population of the upper laser level, and since the other processes which relax the upper laser level without useful optical output are also dependent upon density or population of the upper laser level, the population of the upper laser level can be determined. Thereafter, rate equations are used to compare the rate of relaxing the 010 level or other bottleneck level and the rate of relaxing the upper laser level, iteratively, until there is determined the proper amount of relaxant to achieve a balance at the maximum differential between the upper and lower laser levels. For simplicity, the lower laser level may be assumed to be at the population of the bottleneck level and vice versa; on the other hand, to perform the determination in a more detailed and precise fashion, the assumption need not be made that the lower laser level and bottleneck level are at the same population. Of course, the best that can be done is achieving a population of the bottleneck level which is the equilibrium population at any temperature for the gas, and this is why the gas temperature must be considered distinctly from the determination of the amount of relaxant gas. It is possible for empirical knowledge or from calculations to assume a maximum velocity and a first approximation of mass flow and thereby determine approximately the minimum temperature at which the laser will be able to operate, such as 300° K. From this temperature one knows precisely the minimum population of the bottleneck level and, therefore, the minimum population of the lower laser level to a first approximation. As described hereinbefore, the rates of the various processes can be expressed and therefore the amount of helium necessary to achieve those rates for maximum differential between the two levels can be determined.

In accordance with the invention, if the amount of relaxant gas is limited as above described, it then follows that the temperature removal requirements (as expressed with particular respect to FIG. 8 hereinbefore) must be accommodated by gases other than relaxant gas. In order to achieve this, it is therefore necessary to provide a total mass flow of gases, including a proper proportion of relaxant gas as described hereinbefore, in order to transport heat from the optical gain region as necessary. The amount of energy being brought into the optical gain region can easily be calculated in accordance with principles known in the art. The amount of energy being removed optically can easily be measured by utilization of a calorimeter or other similar device to measure the power in the output beam, externally of the laser. Obviously, all of the remaining power must be extracted either through the walls (as described with respect to FIG. 8 hereinbefore) or through the transportation of particles out of the optical gain region. This power can be calculated in accordance with equation (3), hereinbefore, where the ratio of relaxant gas to lasing gas is known, and the remaining gases are so chosen with respect to their specific heat to provide a total heat-extraction capability, as in equation (3), equal to the difference between the amount of energy being introduced into the optical gain region and the energy being removed therefrom in optical output.

ELECTRIC FIELD CONSIDERATIONS

Necessarily, the inclusion of a sufficient mass flow to accommodate the heat-extraction requirements of the optical gain region affects the electric excitation region of the laser. This invention is predicated in part, as alluded to hereinbefore, on the fact that prior art lasers have apparently failed to give proper consideration to the relationship between the need to remove heat from the optical gain region, which suggests an increase in mass flow, and the concomitant need to maintain as high an electric power density as possible, with the highest possible ratio of upper laser level excitation (optical output) to other levels of excitation (waste). Obviously, it is not only necessary to create optically useful population inversions in the electric field region, but to minimize the percentage of power that results substantially in heat, for the detailed considerations given hereinbefore relative to maintaining a suitable population inversion.

Figure 13:
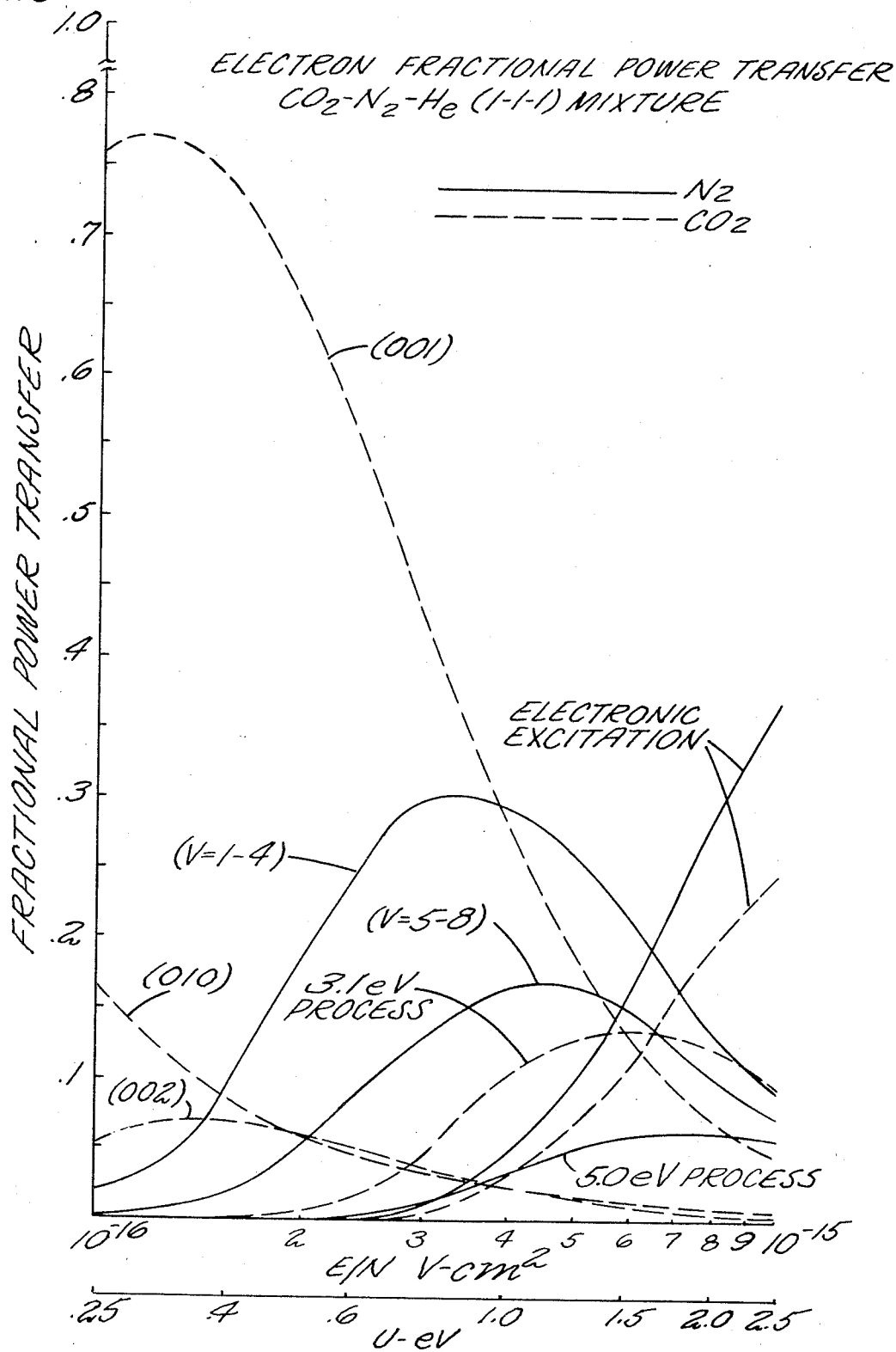
FIG. 13 is a chart of the fractional power transfer to the various collisional channels available in $N_2$—$CO_2$—He mixture of FIG. 12.

The present invention utilizes the concept of increased mass flow to an advantage, rather than suffering detrimental performance losses as in the prior art. Referring now to FIG. 12, the electron power transfer per electron per molecule, in watts per cubic centimeter, is plotted as a function of the ratio of the electric field to the neutral gas density (in volt-cm.$^2$) for an exemplary, equal portions $CO_2$—$N_2$—He laser of the FIG. 1 configuration referred to hereinbefore. Therein, the total power on a per electron per neutral molecule basis is seen to increase from about $5 \times 10^{-29}$ to about $1 \times 10^{-27}$ watts per cm.$^3$ as the ratio of electric field (E) to neutral particle population density (N) increases from roughly 1 to $8 \times 10^{-16}$ (volt-cm.$^2$). Notice that the percentage of the total power transfer into the gases in the form of electronic excitation increases markedly with an increase in the E/N ratio. On the other hand, the rate of excitation of the vibrational levels of nitrogen is substantially constant from about $3 \times 10^{-16}$ volt-cm.$^2$ upwardly, and the 001 and 002 levels of $CO_2$ decrease with an increase in E/N ratio above about $1.5 \times 10^{-16}$ volt-cm.$^2$. The information in FIG. 12 is illustrated in FIG. 13 in terms of fractional power transfer as a function of the E/N ratio. That is, of the total power which can be transferred into the gases within the electric discharge, the fractional distribution of that power among the different energy states as a function of the E/N ratio is illustrated in FIG. 13.

In the case of a gas laser employing an ionized plasma in an electric field as a source of electrons for producing population inversions, the plasma considerations are complex. In order to produce even a weakly ionized plasma, sufficient ions for space-charge neutralization must exist therein. Without sufficient ions, the plasma cannot be maintained. In electric discharges commonly used in flowing gas lasers known to the art, the requisite ions are produced in the bulk of the plasma through electron collisional processes which result in electronic excitation of the type referred to in FIGS. 12 and 13. Thus, the E/N ratio of the electric discharge must be set sufficiently high to produce necessary electronic excitation for ionization and subsequent plasma maintenance. On the other hand, if the E/N ratio is too high, then too great a proportion of the input power resides in electronic level excitation, which results mainly in ionization and not in upper laser level and other excitation contributing to useful optical power output. Although a lower E/N ratio could apparently provide a much more efficient electric discharge by providing predominantly useful laser excitation, the process would terminate because of failure to provide enough electronic excitation to maintain the plasma.

In the general case, it is immaterial how the electrons are provided within the electric field region. Thus, an ionized plasma as described hereinbefore may be utilized, or some other source of electrons (such as a heated cathode or an electron beam source) may be utilized. The only important consideration is the electron density, the magnitude of the electric field, and the natural gas density, as described with respect to an exemplary gas laser and illustrated in FIGS. 12 and 13 hereinbefore. In the general case, one can determine the ratio between the lasing gas and the additional gas which is useful in promoting upper laser level excitation in the lasing gas. Inquiry into the role that nitrogen plays in the $CO_2$ laser reveals that the advantage of using nitrogen lies not only in the fact that the first vibrational level of nitrogen assumes a portion of the energy that may otherwise go into wasted energy levels, and later transfers this energy to the upper laser level of $CO_2$, but also in the fact that it enhances excitation of $CO_2$. By referring to FIG. 13, it can be seen that approximately twice as much power is transferred to vibrational levels of nitrogen ($\nu=1-4$, $\nu=5-8$) as that transferred directly to the 001 level of $CO_2$. Thus, a good proportion of vibrationally excited nitrogen molecules are produced and act as an intermediary, or as a storage medium, later transferring this energy to the 001 level of $CO_2$ molecules through near resonant collisions, as is known in the art. However, it has been surmised in the art that virtually all of the $CO_2$ (001) excitation is transferred through vibrational levels of nitrogen to the upper laser level. This is not true, as can be seen by comparing the power directly transferred into the upper laser level with the power transferred to the vibrational levels of nitrogen in FIGS. 12 and 13. Thus, about one-half as much energy is transferred directly into upper laser level excitation as is transferred to the useful vibrational levels of nitrogen. One might then surmise whether or not it would be possible to have an effective $CO_2$ laser utilizing the electric discharge plasma without any nitrogen present. It would appear from FIG. 13 that this could be possible, particularly at lower E/N ratios, or lower average electron energies, since the power transfer to $CO_2$ exceeds half of the total for E/N values of less than about $1.3 \times 10^{-16}$ volt-cm.$^2$. However, this fails to take into account the effect which nitrogen has on the electron collisional processes in the plasma. In $CO_2$ alone, or $CO_2$ and a relaxant gas, prior art attempts have demonstrated extremely low power outputs. The reasoning, however, has not been manifested in the art. It is, in accordance with the present invention, now known that the $CO_2$ operating alone in the electric discharge plasma does not provide a proper inelastic barrier; in other words, the electrons are accelerated, on the average, to much higher average energies prior to collision so that electron collisions result in the excitation of higher energy states (electronic states) rather then the vibrational states useful for laser operation. In addition, the cross section for 100 level excitation (which is described hereinbefore as the lower laser level) appears only at higher energies, and production of these states should obviously be avoided in order to produce useful laser output. In other words, at higher electron energies, the cross section for production of upper laser levels and lower laser levels become very nearly equal. It has been learned that the introduction of nitrogen into the plasma provides an inelastic collision barrier which thereby forces a condition to exist in the plasma in which a greater proportion of collisions occur at lower energies than in the case of $CO_2$ alone. At these energy levels, the cross section for production of vibrational levels of nitrogen is higher than that for production of upper laser levels of $CO_2$ directly, but the combination of these cross sections is very high with respect to the total. For instance, useful excitation accounts for about 50 percent of the power coupled into the gas in a laser employing an equal mixture of $CO_2$, $N_2$ and He at average electron energies of about 1.8 ev., as shown in FIG. 13. Of course, a lower electric field with $CO_2$ alone may be considered, but this would be incapable of producing sufficient ionization to maintain a plasma. Another way to look at this is: nitrogen acts as a storage mechanism and allows energy to be put in a potentially useful place and stored therein without causing adverse electronic effects in the plasma insofar as upper laser level excitation of the lasing gas is concerned. Thus, the foregoing discussion relative to nitrogen and $CO_2$ indicates that a ratio of these two gases can be chosen which is optimum for the production of an ionized plasma in which the electric field is maintained at a level where the production of useful upper laser level excitation corresponds to a significant fraction of the total electron energy input.

This role of nitrogen may also be played by other gases. For instance, reference to FIG. 13 illustrates that it could be desirous to operate at lower average electron energies, thereby taking advantage of the high cross section for upper laser level excitation in $CO_2$ by direct electron collision. As is described in a copending application of the same assignee entitled GAS LASER LOW IONIZATION ELECTRIC DISCHARGE, Ser. No. (UAC Docket No. R-1427) filed on even date herewith by Bullis and Nighan, the usage of cesium in such a case is disclosed and claimed. Basically, cesium provides inelastic channels that result in ionization at energy levels as low as 1.4 ev., which is sufficiently near the maximum cross section of $CO_2$ (1.2 ev.) so that both objectives of maintaining the plasma and selective preferential excitation of the lower laser level of $CO_2$ are achieved.

In the general case, similar considerations can be applied to choose a proper ratio between any lasing gas and any additional gas which promotes preferential excitation of upper laser level energy states. It should be noted that excitation of upper laser level (and perhaps other useful levels, such as the first vibrational level of nitrogen) occurs as a result of electron collisions. This requires the presence of electrons which are accelerated within an electric field. If a plasma is utilized, and the electrons are created within the plasma, then conditions for production of sufficient ions to provide electronic neutrality, and thus maintain the plasma, must be given. On the other hand, if, as is possible in the general case, the electrons are provided through some other mechanism (such as boiling from a cathode) many of the above collisional considerations remain the same, although generation of sufficient ions to maintain the plasma need no longer be considered. The determination of the electric field and pressure therefore may differ in dependence upon whether or not sufficient ionization to maintain a plasma is required. On the other hand, determination of the ratio of gases (in contrast to the magnitude of the electric field and its relationship to the neutral gas density) is dependent of this consideration and is dependent only upon the optimization of the electron collisional processes which are involved in producing upper energy states.

In order to determine the correct proportions of a lasing gas and an additional gas, if any, energy distribution equations, which are pertinent in determining the effects of electron collisions, in an accelerating electric field, upon the particles of a gas mixture, may be utilized. It should be pointed out at this time, that there is no simple, slide rule or table look-up approach to determination of gas proportions. But, just as the operation of a gas laser is extremely complex, so is the utilization of relationships which describe laser characteristics.

The first step is to solve the combined Boltzmann-Fokker-Planck equation in order to determine the electron energy distribution function for conditions, in the example being considered, of a partially ionized gas mixture in the presence of a DC electric field. This is done by assuming a fractional concentrations for the various gases and solving the equation for the electron energy distribution function, iteratively, until the correct functional form of the distribution function is obtained when all collisional processes are considered. Once the electron energy distribution function is determined, then this value may be substituted into an electron energy conservation equation to determine the electron power transferred to the various collisional channels (such as ionization, vibrational excitation and electronic excitation) available in the plasma.

The combined Boltzmann-Fokker-Planck equation may be appropriately expressed:

$$-\frac{1}{3}\left(\frac{E}{N}\right)^2 \frac{u\frac{df}{du}}{\sum_j \delta_j Q_{ej} + \alpha Q_{ei}} = \sum_{jk} \delta_j \int_u^{u+u_{jk}} ufQ_{jk}du$$

$$+\left[\sum_j \frac{2m}{M_j}\delta_j u^2 Q_{ej} + \frac{2m}{M_i}\alpha u^2 Q_{ei}\right]\left[f + u_y\frac{df}{du}\right]$$

$$+2\alpha u^2 Q_{ee}\left[f\int_0^u U'^{1/2}f'du' + \frac{2}{3}\frac{df}{du}\right]$$

$$\left[\int_0^u U'^{3/2}fdu' + u^{3/2}\int_u^\infty f'du'\right] \quad (9)$$

for simplicity, consider equation (9) in parts:

$$(10a)=(10b)+(10c)+(10d) \quad (10)$$

The terms (10a)–(10d) are individually set out hereinafter for simplicity.

The influence of the electric field on the electron distribution function is expressed in the left-hand term:

$$-\frac{1}{3}\left(\frac{E}{N}\right)^2 \frac{u\frac{df}{du}}{\sum \delta_j Q_{ej} + \alpha Q} \quad (10a)$$

where
$E$ is the electric field
$N$ is the total number density of neutral gas particles
$u$ is the electron energy
$f$ is the electron energy distribution function
$j$ denotes energy state $j$ of a gas specie $\delta_j = n_j/N$ the fractional concentration of a specie of gas at energy $j$
$Q_{ej}$ is the electron-neutral momentum transfer cross section for specie state $j$, as a function of electron energy
$\alpha = n_e/N$ the degree of ionization in the plasma
and
$Q_{ei}$ is the effective electron-ion momentum transfer cross section The influence on the electron distribution function on the various possible channels for energy transfer in the gas is expressed by the three right-hand terms (10b)–(10d) of equation (9). The first of these is an expression which deals with processes which result in a large energy transfer per electron collision with neutral particles of all of the gases, resulting in, for example, the creation of ions, particles excited to electronic states, and vibrational excitation of molecules. The expression for these inelastic electron-neutral collisions is $$\sum_{jk} \delta_j \int_u^{u+u_{jk}} ufQ_{jk}du \quad (10b)$$

where
$k$ denotes energy state $k$ of a gas specie
$u_{jk}$ is the energy change going from state $j$ to state $k$
and $Q_{jk}$ is the inelastic cross section for the electron collisional process which produces a change from state $j$ to state $k$, as a function of electron energy It is the states which are excited as a result of processes expressed in function (10b) which result in energy states useful for laser operation (as well as in energy states not useful in contributing to optical output power). The third term (10c) is an expression for elastic electron-neutral collisions, the energy transfer of which is extremely small on a per collision basis since the energy exchange in this type of collision is the ratio of the mass of the electron to the mass of the heavy particle with which it collides (such as one part in 20), but this expression becomes important when there are very many particles. Since these collisions result in the transfer of very little energy between the electron and the neutral particle with which it collides, they are significant only in determination of the electron energy distribution function, and are not significant in terms of creation of energetic states in the gases. The influence of elastic electron-neutral collisions on the distribution function is expressed as:

$$\left[ \sum_j \frac{2m}{M_j} \delta_j u^2 Q_{ej} + \frac{2m}{M} \propto u^2 Q_{ej} \right] \left[ f + u_g \frac{df}{du} \right] \quad (10c)$$

where
  $m$ is the electron mass
  $M_j$ is the mass of specie $j$
  $M_i$ is the mass of an ion of species $i$
and
  $u_g$ is the effective energy of the gaseous bath in the electric field region In the case where a high degree of ionization exists in a plasma, the influence of electron-electron collisions, and their effect on thermalizing the distribution function must be taken into account. This is represented by the third function of the combined equation as follows:

$$2 \propto u^2 Q_{ee} \left[ f \int_0^u u'^{1/2} f' du' + \frac{2}{3} \frac{df}{du} \right] \left[ \int_0^u u'^{3/2} f' du' + u^{3/2} \int_u^\infty f' du' \right] \quad (10d)$$

where
  $Q_{ee}$ is the effective electron-electron momentum transfer cross section
  $u'$ is an arbitrarily selected trial value of $u$
and
  $f'$ is an arbitrarily selected trial value of $f$ Of course when the degree of ionization is small, then the term alpha is small and the relative influence of these types of collisions is small in comparison to the inelastic processes and, as a consequence, the distribution function tends to be highly non-Maxwellian.

Utilizing equation (9), which includes the four relationships (10a)–(10d), one can iteratively determine electron distribution functions for various mixtures of gases in which the fractional proportions of the different species are arbitrarily chosen, bearing in mind that the fractional proportion of the relaxant gas is determined by considerations of the relaxation rate of the upper state of a limiting self-relaxation process between the lower laser level and the ground state in the region of optical gain. In applying equation (9), the arbitrary fraction of lasing, relaxing and additional gases (such as $CO_2$, He and $N_2$) are chosen; this automatically determines the fractional concentrations of the various gases $$\delta_j = n_j/N \quad (11)$$

The cross sections for raising the various gases from one energy state to another have been published in numerous places, and as a guide in determining sources for this information it is suggested that one consult the BIBLIOGRAPHY OF ATOMIC AND MOLECULAR PROCESSES, Published by the Oak Ridge National Laboratory. Additional bibliography for this data is found in numerous reports of the Joint Institute For Laboratory Astro-Physics, published by the University of Colorado, at Boulder. The equation can then be solved repetitively for $f$, for various values of E/N. With this information, it is then possible to solve the electron energy conservation equation (12) to determine the electron power transferred to the various collisional channels available in the plasma on a per electron per neutral particle basis.

$$-\frac{\left(\frac{E}{N}\right)^2}{3} e \left(\frac{2e}{m}\right)^{1/2} \int_0^\infty \frac{u \frac{df}{du}}{\sum_j \delta_j Q_{ej}} = e \left(\frac{2e}{m}\right)^{1/2} \sum_j \delta_j \frac{2m}{M_j}$$

$$\int_0^\infty u^2 Q_{ej} \left( f + u_g \frac{df}{du} \right) du \quad (12)$$

$$+ e \left(\frac{2e}{m}\right)^{1/2} \sum_{jk} \delta_j u_{jk} \int_0^\infty u f Q_{jk} du$$

The parameters are described in detail with respect to relationships (10a)–(10d), hereinbefore. It should be noted that the left hand term of equation (12) represents the electrical power imparted into the electron gas. This relationship may also be expressed as the ratio of electric field current density product to the product of the densities of electrons and neutral particles as follows:

$$JE/n_e N \quad (13)$$

The first term on the right hand side of equation (12) represents the elastic energy transfers, within which very little energy is transferred between an electron and a neutral particle with which the electron collides. However, the relationship does become significant when there are sufficient particles involved, and consideration must be given to this term. The second term on the right-hand side represents the inelastic energy transfers and amounts to the summation of the energy required for a given specie to change from state $j$ to state $k$ times the average closing velocity of particles between state $j$ and state $k$ divided by the number of particles involved in such energy transfers as follows:

$$\sum_{jk} \frac{u_{jk} \overline{V}_{jk}}{N} \quad (14)$$

Thus, for any electron distribution function determined in equation (9), equation (12) may be solved to determine the distribution of power, in watt-cm.$^3$ on a per electron per neutral basis as illustrated in FIG. 12, or by considering the power as fractional, as presented in FIG. 13. It may be noted that since the electron-electron collisions and electron-ion collisions affect only the electron energy distribution function, these collisions are not represented in equation (12), although they must be considered in equation (9) in the determination of the distribution function. The term $(2e/m)^{1/2}$ is included in all portions of equation (12) to obtain results in units of watts per electron per neutral (as in FIG. 12). It is possible by repeating the steps involved with equations 9 through 14, iteratively, one can determine the maximum power and maximum efficiency points as a function of gas concentrations. This procedure can be materially aided by combining experimental data with the data derived in the above iterative processes.

The foregoing represents a complex, iterative method of determining fractional gas concentrations in order to satisfy desired operational parameters. Of course, utilization of these relationships is best exploited when computational aids, such as computers, are employed in order to iteratively produce a variety of electron energy distribution functions for various arbitrary choices of gas specie concentrations. On the other hand, the choice of gases may be empirically determined (provided the requirements of the gas in the optical gain region are accommodated in accordance with the teachings hereinbefore) by operating the laser and monitoring both optical output power, and optical output power as a function of electrical input power, to determine the proper choice of gas ratios, as well as ratios of electric field to neutral gas densities. Best results are, however achieved when bearing in mind that, even though the ratio of electric field to neutral density may vary from a point of maximum efficiency (that is maximum power per electron per neutral particle) to a point of maximum power density, the ratio of laser gas to additional gas will usually not vary. Thus, whether one employs the iterative theoretical processes described with respect to equations (9) through (14) hereinbefore or an empirical output power monitoring method, one can determine the proper fractional concentrations of lasing and additional gas for maximum power and efficiency. As the electric field and pressure are adjusted to further enhance operation, the ratio of these gases remains the same. In other words, the ratio of these gases for maximum useful laser excitation is a function of the gas species alone, and this ratio remains optimum for any set of operational parameters in the electric field region, whether or not the gases have to take into account the need to produce ions in order to maintain the plasma. If ions are to be produced, then the ratio of gases may differ from the case where ions need not be produced because of utilization of a different source of electrons for the electron excitation of the lasing gas (and perhaps the additional gas). On the other hand, in the case of a mixing laser configuration (as in FIG. 1 herein), either by solution of the equations given hereinbefore or through inherent operation, it is readily determined that the concentration of but a single gas useful in promoting excitation of upper laser level in the lasing gas somewhat simplifies this problem. It is, nonetheless, generically true that the amount of additional gas is significant in determining upper laser level excitation, whether this amount is a function only of the need to produce stored energy in vibrational states which are near-resonant with upper laser levels of the lasing gas or whether the additional gas is premixed with the lasing gas and performs the additional function of adjusting the electronic conditions within the electric field region so as to promote useful excitation of either or both gases, as is described with respect to nitrogen and $CO_2$ hereinbefore. The effect of the amount of relaxant gas on the electric field region as described hereinbefore is merely to alter the neutral gas density, and therefore the ratio of the electric field to the population density of neutral of un-ionized particles within the electric field region. Usually, the relaxant gas will have a high ionization potential and its electronic effect within the electric field can therefore be ignored, except to the extent that the relaxant gas particles contribute to the population density of neutral particles within the electric field region, and to losses, as described hereinafter. However, the foregoing is applicable to relaxant gases having electronic significance as well.

Background information useful in handling the theoretical approach set forth in equations (9) through (14) may be found in:

Shkarofsky, I. P., et al., "*The Particle Kinetics of Plasmas,*" *Addison, Wessley Publishing Co.: Reading, Mass;* 1966.

Additionally, the following authors can be consulted for further background information:

Holstein, T.: Physics Review 70, 367 (1946)
Sherman, B.; J. Math. Analysis 1, 342 (1960)
Engelhardt, A. G.; Phelps, A. V.; Risk, C. G.: Physics Review 136, No. 6A (Sept. 1964)
Frost, L. S.; Phelps A. V.: Physics Review 127, 1621 (1964)
Hake, R. D. Jr.; Phelps, A. V.: Physics Review 158, No. 1 (1967)

Further, additional information as described above may be found in:

Nighan, W. L.; Bennett, J. H.: Applied Physics Letters, 14, 240 (Apr., 1969)

Referring again to FIG. 12, it is apparent that the power transfer per electron per neutral particle is substantially constant for the vibrational levels 1–8 of nitrogen and does not lower significantly for the upper laser level (001) of $CO_2$, for E/N ratios above $3\times10^{-16}$ volt-cm.$^2$. Thus, significant increase in output power may be achieved by increasing the number of electrons and/or the number of neutral particles, and even though the fractional energy transfer into these processes (FIG. 13) may decrease.

In accordance with the present invention, another aspect of electric discharges which have not been given proper consideration in the prior art is the effect that increasing the energy losses within the region of the electric field has on the ability of the electric field to impart power into the gas, and for the electron gas to impart useful energy into either the lasing gas or an additional gas which can store the power and subsequently transfer it into the lasing gas (such as nitrogen in an $N_2$-$CO_2$ laser). As described briefly hereinbefore, the danger in operating any gaseous plasma with too high a degree of ionization (ratio of electron density to neutral density) is simply that the electron temperature and the gas temperature approach one another, and eventually the plasma inverts into a thermal arc, wherein substantially all of the energy is transferred into levels which do not support the production of a population inversion in plasmas typical of the $N_2$-$CO_2$-He system. This commonly results in an increase in the random kinetic energy or heating of the gas. The heating effect, however, can be mitigated by carrying away thermally excited particles at a sufficiently high rate. Thus, by increasing the mass flow through the electric discharge region, the gas is cooled, and a higher electron density can be supported without conversion into a thermal arc. In addition, it is known that the electron density of any given gas laser is directly linked to the electron energy distribution function. The electron distribution function, in turn, is substantially directly proportional to the E/N ratio. In conventional systems, the electron density varies inversely to the E/N ratio. Thus, prior attempts to operate at higher pressure so as to increase the density of gases have probably failed since the increase in neutral density has been counterbalanced by the decrease in electron density in these systems. As illustrated in FIGS. 12 and 13 hereinbefore, power transferred into various energy levels of the gas is a function of the electron density and the neutral density. In other words, FIG. 12 illustrates that one can expect to couple on the order of $10^{-27}$ watts into the gas per electron per neutral. Obviously, the total wattage coupled into the gas increases with each electron and with each neutral. Therefore, to increase the neutrals without decreasing the electrons, the electric field must be increased concomitantly so as to maintain a proper E/N ratio for adequate electron density as well as the desired optimum excitation of the upper laser level as described hereinbefore. Or, as described hereinafter, the rate of electron density to E must not be inverse or negative. With this technique, as can be readily understood, the power density of the laser can be significantly increased. As a demonstration of the above teachings, maximum power output in lasers operated in accordance with the above principles nominally occur at pressures of between 40 and 125 torr as opposed to state of the art lasers which achieve maximum power output at nominal power levels with pressures around 10 torr. An alternative way to look at the effective mass flow upon electron collisional processes within a gas situated in an electric field, is to consider the relationship between the electric field, the current density, and the power generated within the gas in the electric field region. If the power-dissipating capacity of the gases within the electric field region is increased, then the product of electric field times the current density can also be increased without violating the principles of equations (9) and (12) hereinbefore. Since maintenance of the proper E/N ratio relates to electron density quite closely, one can loosely consider that the current density is fairly rigidly limited for any given desired optimum E/N ratio. If specific power is to increase, and current density is kept constant, then the E-field must be increased correspondingly. Thus, an increase in mass flow may be used to advantage in the production of greater amounts of upper laser level excitation by recognizing that this permits use of a higher electric field without the plasma reverting into a thermal arc.

It should be noted also, that the relationships expressed in equations (9) and (12) hereinbefore relate not only to DC electric discharge plasmas, but pertain to any flow of electrons in a multigas mixture stimulated within an electric field. Thus, the foregoing relationships may be employed in other than an electric discharge plasmas to determine the relationships involved in generating useful laser states through electron collisions with gas particles.

Figure 14:
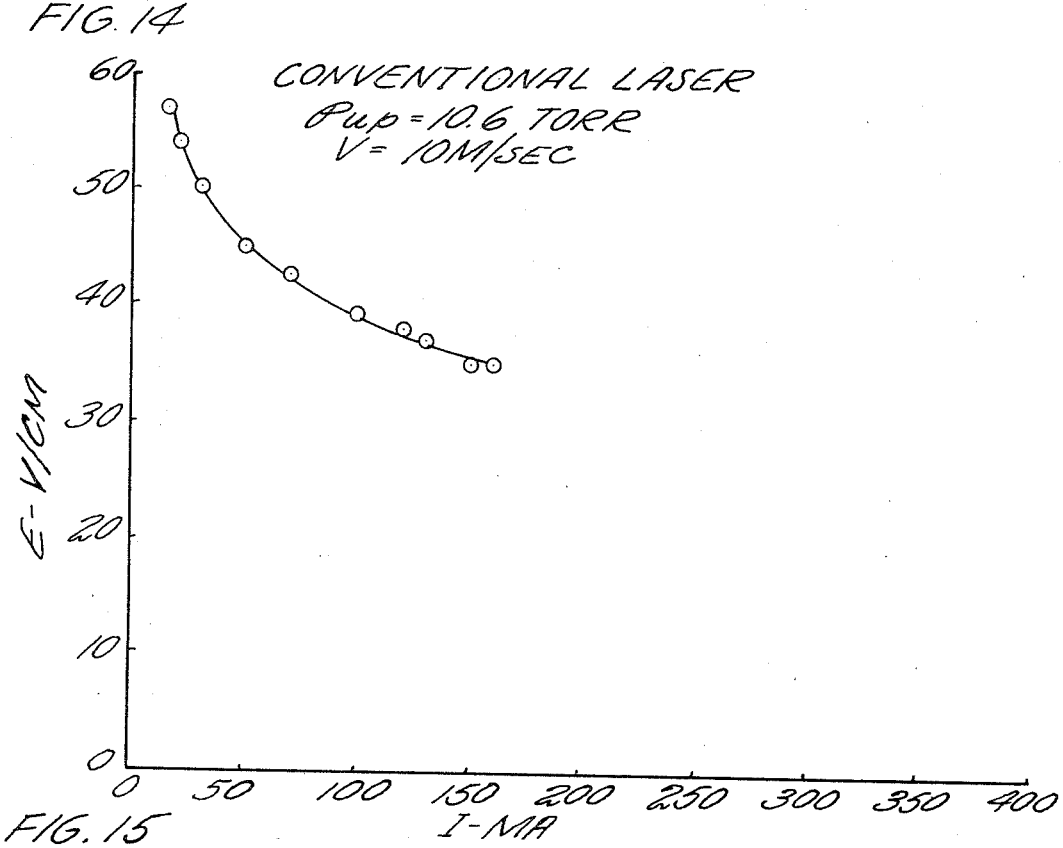
FIGS. 14 and 15 are illustrations of current/voltage characteristics of a typical prior art laser and of a laser operating in accordance with the present invention, respectively.
Figure 15:
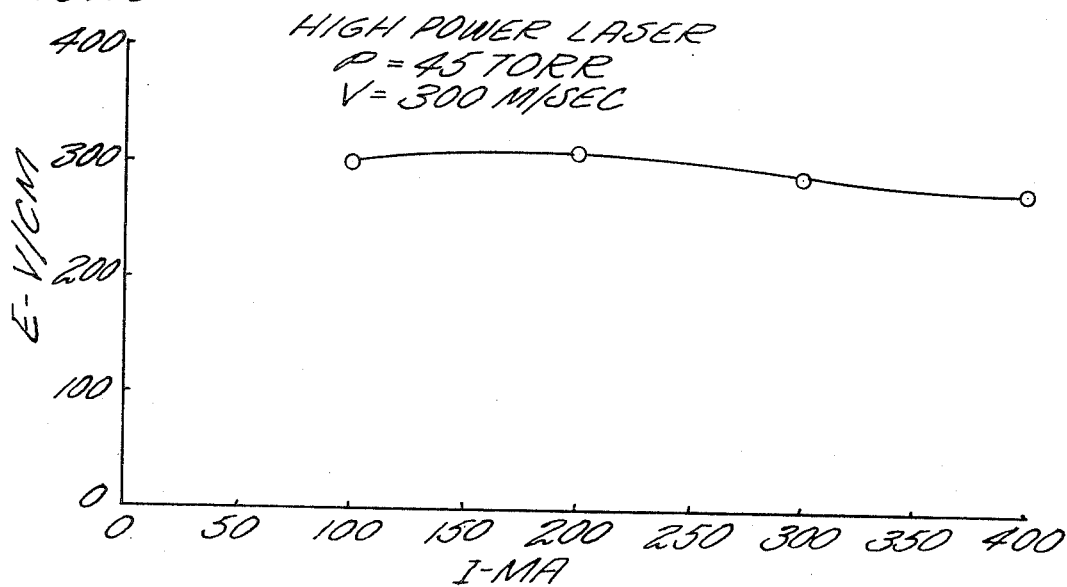

For instance, FIG. 14 illustrates the negative current-voltage characteristic for a coaxial laser (similar to the configurations of FIGS. 3 and 4 herein) operating in accordance with the prior art at about 10 torr and gas flow velocities of 10 meters per second, with roughly equal parts of $CO_2$, $N_2$ and He. The same configuration with the same mixture, when operated in accordance with the present invention at 45 torr and about 300 meters per second, has a substantially flat voltage-current characteristic capable of sustaining a much higher voltage, at a given current density as shown in FIG. 15. Above about 300 milliamperes, the curve tends to flatten out as a result of the increased losses. Thus, comparison of operation of this laser in the two different regimes thoroughly demonstrates this aspect of the present invention: to wit, that accommodating the needs of the electric discharge is not only not antagonistic to the thermal and limiting relaxation process requirements in the optical gain region, but can, with proper adjustment of the electric field, further increase the total rate at which electrical power is converted into upper laser level excitation.

The voltage-current curve illustrates that as the electric field is increased, and more particularly as there is an increase in the electric field to neutral gas density ratio, there will be no penalty in the number of electrons (as could result if there were a negative voltage-current characteristic. This illustrates the fact that the collisional characteristics of the plasma have been materially altered as a result of increased losses, which in turn result from high mass flow through the electric discharge. Since an increase in the E/N ratio will in this case allow an increase in the E·J product, and therefore the total power coupled into the gases, the total power to the gases can be increased without materially altering the fractional power transfer characteristics. Thus, not only can more power be put into the gas, but the increase in power will fall into the various channels in substantially as beneficial a fashion as at the lower E/N ratio. In other words, more power can be coupled into the desired channels even though it takes a greater proportion of power to do so. Thus, power can be increased by increasing the E/N ratio even though it is at a lower efficiency.

In all, establishment of high-power density, high specific power, maximum power laser operation in accordance with the present invention involves the establishment of a choice of gases, a design goal of maximum output power, an estimate of power density which can be sustained in the gas system chosen, the size of the optical gain region, and the size of the pumping capacity which can realizably be obtained (up to a size desired for use); from this, the flux can be chosen, and thence the rate of photon emission can be determined as described hereinbefore. Then, the amount of relaxant gas necessary to suitably relax any bottlenecking level can be chosen. The proportion of relaxant gas and lasing gas can remain relatively fixed while electron collisional considerations are employed to determine a useful ratio of additional gas to lasing gas in the electric discharge region. These gas ratios will remain substantially constant for reasonable variations in other operating parameters. Thereafter, the electric field can be moved to a point of maximum electron density, less than that which may result in thermal arcing, for maximum generation of useful laser states.

The invention is described in its generic terms, with exemplary reference to $CO_2$, $CO_2$-$N_2$ and $CO_2$-Cs lasers, with relaxant gases such as He and $H_2O$. The invention has been proven in an $N_2O$-$N_2$-He system as well.

In summary, we teach that it is important to keep the gas temperature low and that it is impossible to maintain the lower laser level at a population density which is less than the equilibrium population density of the bottleneck level determined by the temperature of the optical gain gaseous bath under high-power laser-operating conditions. We have taught that high mass flow increases the losses in the plasma and forces operation with higher electric field, which permits increasing the particle density upon which upper laser level excitation depends without materially altering the fractional power distribution into the various channels in the gas. We have taught that the amount of relaxing gas should be critically limited to that amount which will provide maximum differential between upper and lower laser levels when taking into account the effect of the relaxant gas on the upper and lower levels in conjunction with the rate of excitation of the upper laser level and the rate of stimulated photon emission. We have further described that operation is best effected with said critical amount of relaxant gas and a proper mass flow due to the impracticality of heat transfer through gases which is required in wall-dominated systems. We have described a method of determining a proper ratio of lasing gas to other gas useful in promoting the excitation of the upper laser level. We have described how the ratio of the electric field to neutral particle density can materially affect the proper balance between optimum ionization and optimum preferential power transfer into channels useful in deriving optical power output. We have further presented experimental data which corroborates the theoretical teachings herein, and which illustrate the criticality of these teachings in contrast with operation and attempted theoretical explanation of lasers in the prior art. Specifically, these results have been proven by the positive voltage-current characteristics illustrated in FIG. 14 herein; further, maximum power operation in excess of 125 torr has been achieved. Most importantly, optical output power which is several orders of magnitude higher than any achieved in the prior art has been achieved by practicing the present invention.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of our invention, that which we claim as new and desire to secure by Letters Patent of the United States is:

1. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field, comprising:

providing an electric field in the region of optical gain and a flow of electrons therein; and providing flow of the lasing gas and a relaxant gas through the region of optical gain, the ratio of the magnitude of the electric field to the number density of the un-ionized gas flow providing substantially the maximum rate of excitation of the upper laser level of the lasing gas, the gas flow in the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant being that which provides rates of relaxation of the upper energy state of the limiting relaxation process and the upper laser level which with the rate of stimulated photon emission provide substantially maximum positive differential between upper and lower laser level populations for any given rate of upper laser level excitation.

2. In the method of establishing operation of a flowing multigas laser system of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field having a flow of electrons therein, the lasing gas and a relaxant gas flowing through the region of optical gain at the maximum velocity obtainable within the physical limitations of the system, the improvement comprising, repetitively as necessary, to increase optical power output:

providing an amount of relaxant gas which provides rates of relaxation of the upper energy state of the limiting relaxation process and the upper laser level of the lasing gas which with the rate of stimulated photon emission provide substantially maximum positive differential between upper and lower laser level populations for any given rate of upper laser level excitation, and a total gaseous mass flow rate to provide, throughout the region of optical gain, population of said upper energy state less than a significant fraction of the total population of the lasing gas; and providing the maximum electron density below that which promotes localized arc initiation at the pressure required for said mass flow rate.

3. In the method of establishing operation of flowing multigas laser system of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field having a flow of electrons therein, the lasing gas and a relaxant gas flowing through the region of optical gain, and additional gas, instrumental in promoting transfer of electrical input power into upper laser level excitation of the lasing gas, flowing through the regions of the electric field and optical gain, the flow through the optical gain region being at the maximum velocity obtainable within the physical limitations of the system, the improvement comprising, repetitively as necessary, to increase optical power output:

providing an amount of relaxant gas which provides rates of relaxation of the upper energy state of the limiting relaxation process and the upper laser level of the lasing gas which with the rate of stimulated photon emission provide substantially maximum positive differential between upper and lower laser level populations for any given rate of upper laser level excitation, and a total gaseous mass flow rate through the region of optical gain to provide, throughout the region of optical gain, population of said upper energy state less than a significant fraction of the total population of the lasing gas; and providing, in the electric field region, the maximum electron density below that which promotes localized arc initiation at the pressure required for said mass flow rate.

4. In the operation of a multigas laser of the type in which optical output power is extracted in a region of optical gain from an upper laser level of a lasing gas having a limiting self-relaxation process between a lower laser level and the ground state with a rate substantially slower than the rate of stimulated photon emission, and electrical input power is coupled into the lasing gas through electron collisions in an electric field having a flow of electrons therein, the lasing gas and a relaxant gas flowing through the region of optical gain, the improvement comprising:

providing an amount of relaxant gas which provides rates of relaxation of the upper energy state of the limiting relaxation process and the upper laser level which with the rate of stimulated photon emission provide substantially maximum positive differential between upper and lower laser level populations for any given rate of upper laser level excitation, and a total gas mass flow rate to provide, throughout the region of optical gain, population of said upper energy state less than a significant fraction of the total population of the lasing gas.

5. In the operation of a multigas laser of the type in which optical output power is extracted in a region of optical gain from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region having a flow of electrons therein, the lasing gas and a relaxant gas flowing through the region of optical gain, and additional gas, instrumental in promoting transfer of electrical input power into upper laser level excitation of the lasing gas, flowing through the regions of the electric field and optical gain, the improvement comprising:

providing in the flow through the region of optical gain an amount of relaxant gas which provides rates of relaxation of the upper energy state of the limiting relaxation process and the upper laser level of the lasing gas which with the rate of stimulated photon emission provide substantially maximum positive differential between upper and lower laser level populations for any given rate of upper laser level excitation, and a total gas mass flow rate to provide, throughout the region of optical gain, population of said upper energy state less than a significant fraction of the total population of the lasing gas.

6. Operation of a multigas laser of the type in which optical output power is extracted in a region of optical gain, from an upper laser level of a lasing gas having a limiting self-relaxation process between a lower laser level and the ground state with the rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of the magnitude of the electric field to the number density of the un-ionized gas providing substantially the maximum rate of excitation of the upper laser level of the lasing gas within the region of optical gain, the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

7. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow, and the ratio of the magnitude of the electric field to the number density of the un-ionized gas providing substantially the maximum rate of excitation of the upper laser level of the lasing gas within the region of optical gain, the gas flowing through the region of optical gain having a population of the lower laser level of the lasing gas substantially equal to the population of the upper energy state of the limiting relaxation process and having a temperature to provide, throughout the region of optical gain, population of said upper energy state less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

8. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow, the electron density and the pressure providing substantially the maximum rate of excitation of the upper laser level of the lasing within the region of optical gain, the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

9. Operation of a multigas laser of the type in which optical output power is extracted in a region of optical gain, from an upper laser level of a lasing gas having a limiting self-relaxation process between a lower laser level and the ground state with the rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of magnitude of the electric field to the number density of the un-ionized gas providing substantially the maximum rate of excitation of the upper laser level of the lasing gas within the region of optical gain, the gas flowing through the region of optical gain having an amount of relaxant gas and a total mass flow rate of gases providing, throughout the region of optical gain, population of the upper energy state of the limiting relaxation process less than a significant fraction of the total population of the lasing gas, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

10. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of magnitude of the electric field to the number density of the un-ionized gas providing substantially the maximum rate of excitation of the upper laser level of the lasing gas within the region of optical gain, the gas flowing through the region of optical gain having the highest velocity obtainable within the physical limitations of the laser system and having a temperature to provide, throughout the region of optical gain, population of the upper energy state of said limiting process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

11. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing, in the electric field region, an electric field and a flow of electrons having the maximum electron density and pressure below that which promotes localized arc initiation; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of the magnitude of the electric field to the number density of the un-ionized gas providing substantially the maximum rate of excitation of the upper laser level of the lasing gas within the region of optical gain, the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of the upper energy state of the limiting relaxation process and the upper laser level which with the rate of stimulated photon emission provide substantially maximum positive differential between upper and lower laser level populations for any given rate of upper laser level excitation.

12. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in a plasma within an electric discharge region, comprising:

providing an electric discharge plasma in the electric discharge region; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of the magnitude of the electric field to the number density of the un-ionized gas in the plasma providing substantially the maximum rate of excitation of the upper laser level of the lasing gas within the region of optical gain, the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

13. Operation of a multigas laser of the type in which optical output power is extracted in a region of optical gain from the 001 level of gaseous carbon dioxide, and electrical input power is coupled into gas flowing in the laser through electron collisions in the plasma within an electric discharge region, comprising:

providing an electric discharge plasma in the electric discharge region; and providing flow of the carbon dioxide gas and a relaxant gas through the region of optical gain, and flow, through the regions of the electric field and optical gain, of additional gas instrumental in promoting transfer of electrical input power into the 001 level of carbon dioxide, the amount of carbon dioxide flow, the amount of additional gas flow and the ratio of the magnitude of the electric field to the number density of the un-ionized gas in the plasma providing substantially the maximum rate of excitation of the 001 level of the carbon dioxide within the region of optical gain, the lasing gas flowing through the region of optical gain having a temperature to provide, throughout the region of optical gain, population of the 010 level less than a significant fraction of the total population of carbon dioxide, said temperature being above the precipitation temperature of carbon dioxide at the pressure of said gas flow through the region of optical gain, the amount of relaxant gas being that which provides rates of relaxation of the 010 level and of the 001 level which with the rate of stimulated photon emission provide substantially maximum positive differential between the populations of the 001 and 100 levels for any given rate of upper laser level excitation.

14. Operation of a multigas laser of the type in which optical output power is extracted in a region of optical gain from the 001 level of gaseous carbon dioxide, and electrical input power is coupled into gas flowing in the laser through electron collisions in the plasma within an electric discharge region, comprising:

providing an electric discharge plasma in the electric discharge region; and providing flow of the carbon dioxide gas and a relaxant gas through the region of optical gain, and flow, through the regions of the electric field and optical gain, of additional gas instrumental in promoting transfer of electrical input power into the 001 level of carbon dioxide, the amount of carbon dioxide flow, the amount of additional gas flow and the ratio of the magnitude of the electric field to the number density of the un-ionized gas in the plasma providing substantially the maximum rate of excitation of the 001 level of the carbon dioxide within the region of optical gain, the lasing gas flowing through the region of optical gain having a population of the 100 level substantially equal to the population of the 010 level and having a temperature to provide, throughout the region of optical gain, population of the 010 level less than a significant fraction of the total population of carbon dioxide, said temperature being above the precipitation temperature of carbon dioxide at the pressure of said gas flow through the region of optical gain, the amount of relaxant gas being that which provides rates of relaxation of the 010 level and the 001 level which with the rate of stimulated photon emission provide substantially maximum positive differential between the populations of the 001 and 100 levels for any given rate of upper laser level excitation.

15. Operation of a multigas laser of the type in which optical output power is extracted in a region of optical gain from the 001 level of gaseous carbon dioxide, and electrical input power is coupled into gas flowing in the laser through electron collisions in the plasma within an electric discharge region, comprising:

providing an electric discharge plasma in the electric discharge region; and providing flow of the carbon dioxide gas and a relaxant gas through the region of optical gain, and flow, through the regions of the electric field and optical gain, of gaseous molecular nitrogen, the amount of carbon dioxide flow, the amount of nitrogen flow and the ratio of the magnitude of the electric field to the number density of the un-ionized gas in the plasma providing substantially the maximum rate of excitation of the 001 level of the carbon dioxide within the region of optical gain, the lasing gas flowing through the region of optical gain having a temperature to provide, throughout the region of optical gain, population of the 010 level less than a significant fraction of the total population of carbon dioxide, said temperature being above the precipitation temperature of carbon dioxide at the pressure of said gas flow through the region of optical gain, the amount of relaxant gas being that which provides rates of relaxation of the 010 level and the 001 level which with the rate of stimulated photon emission provide substantially maximum positive differential between the populations of the 001 and 100 levels for any given rate of upper laser level excitation.

16. Operation of a multigas laser of the type in which optical output power is extracted in a region of optical gain from the 001 level of gaseous carbon dioxide, and electrical input power is coupled into gas flowing in the laser through electron collisions in the plasma within an electric discharge region, comprising:

providing an electric discharge plasma in the electric discharge region having the maximum electric field and pressure below that which promotes localized arc initiation; and providing flow of the carbon dioxide gas and a relaxant gas through the region of optical gain, and flow, through the regions of the electric field and optical gain, of gaseous molecular nitrogen, the amount of carbon dioxide flow, the amount of nitrogen flow and the ratio of the magnitude of the electric field to the number density of the un-ionized gas in the plasma providing substantially the maximum rate of excitation of the 001 level of the carbon dioxide within the region of optical gain, the gas flowing through the region of optical gain having a temperature to provide, throughout the region of optical gain, population of the 010 level less than a significant fraction of the total population of carbon dioxide, said temperature being above the precipitation temperature of carbon dioxide at the pressure of said gas flow through the region of optical gain, the amount of relaxant gas being that which provides rates of relaxation of the 010 level and the 001 level which with the rate of stimulated photon emission provide substantially maximum positive differential between the populations of the 001 and 100 levels for any given rate of upper laser level excitation.

17. Operation of a $CO_2$, $N_2$, He gas laser of the type in which optical output power is extracted in a region of optical gain from the 001 level of $CO_2$, and electrical input power is coupled into gas flowing in the laser through electron collisions in the plasma within an electric discharge region, comprising:

providing an electric discharge plasma in the optical gain region having the maximum electric field and pressure below that which promotes localized arc initiation; and providing flow of the $CO_2$, $N_2$ and He through the region of optical gain, the relative proportions of $CO_2$ and $N_2$ and the ratio of the magnitude of the electric field to the number density of the un-ionized gas in the plasma providing substantially the maximum rate of excitation of the 001 level of $CO_2$, the $CO_2$ having a temperature to provide, throughout the region of optical gain, population of the 010 level less than a significant fraction of the total population of $CO_2$, the amount of He being that which provides rates of relaxation of the 010 level and the 001 level of the lasing gas which with the rate of stimulated photon emission provide substantially maximum positive differential between the populations of the 001 and 100 levels for any given rate of upper laser level excitation.

18. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field, comprising:

providing an electric field in the optical gain region and a flow of electrons therein; and providing flow, through the region of optical gain, of the lasing gas, a relaxant gas and additional gas instrumental in promoting transfer of electrical input power into upper laser level excitation of the lasing gas, the relative proportions of lasing gas flow and additional gas flow and the ratio of the magnitude of the electric field to the number density of the un-ionized gas providing substantially the maximum rate of excitation of the upper laser level of the lasing gas within the region of optical gain, the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

19. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas, a relaxant gas and additional gas instrumental in promoting transfer of electrical input power into upper laser level excitation of the lasing gas through the region of optical gain, the relative proportions of lasing gas flow and additional gas flow and the ratio of the magnitude of the electric field to the number density of the un-ionized gas providing substantially the maximum rate of excitation of the upper laser level of the lasing gas within the region of optical gain, the gas flowing through the region of optical gain having an amount of relaxant gas and a total mass flow rate of gases to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation, the pressure of gases being that which provides said number density, the velocity of gas flow being that which provides said mass flow at said pressure.

20. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field, the steps of:

first, initiating flow of the lasing gas and a relaxant gas through the optical gain region;

second, initiating an electric field in the optical gain region and a flow of electrons therein;

then repetitively as necessary, to increase optical power output;

a. adjusting the magnitude of the electric field and the number density of un-ionized gas to provide substantially the maximum rate of excitation of the upper laser level of the lasing gas; and b. adjusting the temperature of gas flow to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

21. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

then repetitively as necessary, to increase optical power output;

a. adjusting the magnitude of the electric field, the number density of un-ionized gas in the region of the electric field, and the amount of lasing gas flow and additional gas flow to provide substantially the maximum rate of excitation of the upper laser level of the lasing gas within the region of optical gain; and b. adjusting the temperature of gas flow through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides a rate of relaxation of said upper energy state and the upper laser level which with the rate of stimulated photon emission provide substantially maximum positive differential between upper and lower laser level populations for any given rate of upper laser level excitation.

22. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the optical gain region, per electron per un-ionized gas particle in the electric field region;

then repetitively as necessary, to increase optical power output;

a. adjusting the magnitude of the electric field and the number density of un-ionized gas in the region of the electric field to increase the rate of excitation of the upper laser level of the lasing gas within the region of optical gain; and b. adjusting the temperature of the gas flow through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant flow being that which provides rates of relaxation of said upper energy state and the upper laser level which with the rate of stimulated photon emission provide substantially maximum positive differential between upper and lower laser level populations for any given rate of upper laser level excitation.

23. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the optical gain region, per electron per un-ionized gas particle in the electric field region;

then repetitively as necessary, to increase optical power output;

a. increasing the electron density and the number density of un-ionized gas in the region of the electric field to levels at which a further increase in both of them results in the initiation of localized arcing;

b. adjusting the temperature of the gas flow through the region of optical gain to provide, throughout the region of optical gain, population of the upper energy state of the limiting relaxation process of the lasing gas less than a significant fraction of the population of the lasing gas at a temperature above the precipitation temperature of the lasing gas at the pressure of said gaseous flow within the region of optical gain, the amount of relaxant gas flow being that which provides rates of relaxation of said upper energy state and the upper laser level which with the rate of stimulated photon emission provide substantially maximum positive differential between upper and lower laser level populations for any given rate of upper laser level excitation.

24. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field, the steps of:

first, initiating flow of the lasing gas, a relaxant gas, and an additional gas instrumental in promoting transfer of electrical input power into upper laser level excitation of the lasing gas;

second, initiating an electric field in the optical gain region and a flow of electrons therein;

third, adjusting the relative proportions of lasing gas and additional gas, and the ratio of the magnitude of the electric field to the number density of un-ionized gas particles within the electric field region to provide substantially the maximum rate of excitation of the upper laser level of the lasing gas per electron per un-ionized gas particles;

then repetitively as necessary, to increase optical power output;

a. adjusting the magnitude of the electric field and the number density of un-ionized gas to increase the rate of excitation of the upper laser level of the lasing gas; and
b. adjusting the temperature of the gas flow to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas flow being that which provides a rate of relaxation of said upper energy state and the upper laser level which with the rate of stimulated photon emission provide substantially maximum positive differential between upper and lower laser level populations for any given rate of upper laser level excitation.

25. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;
second, initiating an electric field in the electric field region and a flow of electrons therein;
third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the region of optical gain, per electron per un-ionized gas particle in the electric field region;
then repetitively as necessary, to increase optical power output;
a. adjusting the magnitude of the electric field and the number density of un-ionized gas in the region of the electric field to increase the rate of excitation of the upper laser level of the lasing gas within the region of optical gain; and
b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

26. In the method of establishing operation of a flowing multigas laser system of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas, said flow having the maximum velocity obtainable within the physical limitations of the laser system;
second, initiating an electric field in the electric field region and a flow of electrons therein;
third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the region of optical gain, per electron per un-ionized gas particle in the electric field region;
then repetitively as necessary, to increase optical power output:
a. adjusting the magnitude of the electric field and the number density of un-ionized gas in the region of the electric field to increase the rate of excitation of the upper laser level of the lasing gas within the region of optical gain; and
b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with equal to the rate of stimulated photon emission provide substantially maximum positive differential between upper and lower laser level populations for any given rate of upper laser level excitation.

27. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;
second, initiating an electric field in the electric field region and a flow of electrons therein;
third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the region of optical gain, per electron per un-ionized gas particle in the electric field region;
then repetitively as necessary, to establish an optical power output at which the population of the upper energy state of the limiting process is substantially equal to the population of the lower laser level of the lasing gas in the region of optical gain:
a. adjusting the magnitude of the electric field and the number density of un-ionized gas in the region of the electric field to increase the rate of excitation of the upper laser level of the lasing gas within the region of optical gain; and
b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

28. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the region of optical gain, per electron per un-ionized gas particle in the electric field region;

then repetitively as necessary, to establish maximum optical power output:

a. adjusting the magnitude of the electric field and the number density of un-ionized gas in the region of the electric field to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

29. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in the plasma within an electric discharge region, the steps of:

first, initiating flow of the lasing gas and a relaxant gas through the region of optical gain, and flow, through the regions of the electric discharge and optical gain, of additional gas instrumental in promoting transfer of electrical input power into upper laser level excitation of the lasing gas;

second, establishing an electric discharge plasma in the electric discharge region;

third, adjusting the amount of lasing gas flow, the amount of additional gas flow and the ratio of the magnitude of the electric field to the number density of un-ionized gas particles in the electric field region to provide substantially the maximum rate of excitation of the upper laser level per electron per un-ionized gas particle in the electric field region;

then repetitively as necessary, to increase optical power output:

a. adjusting the magnitude of the electric field and the number density of un-ionized gas in the region of the electric field to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

30. In the method of establishing operation of a flowing multigas laser of the type in which optical output is extracted in a region of optical gain from the 001 energy level of gaseous carbon dioxide, and electrical input power is coupled into the gas flow in the laser through electron collisions in an electric field region, the steps of:

first, initiating flow of the carbon dioxide gas and a relaxant gas through the region of optical gain, and flow, through the regions of the electric field and optical gain, of additional gas instrumental in promoting transfer of electrical input power into excitation of the 001 level of carbon dioxide;

second, initiating an electric field in the electric field region and a flow of electrons therein;

third, adjusting the amount of carbon dioxide gas flow, the amount of additional gas flow, and the ratio of the magnitude of the electric field to the number density of un-ionized gas particles within the electric field region to provide substantially the maximum rate of excitation of the 001 level of the carbon dioxide in the optical gain region, per electron per un-ionized gas particle in the electric field region;

then repetitively as necessary, to increase optical poser output:

a. increasing the magnitude of the electric field and the number density of un-ionized gas in the region of the electric field to increase the rate of excitation of the 001 level of carbon dioxide within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides a rate of relaxation of said upper energy state and the upper laser level which with the rate of stimulated photon emission provide substantially maximum positive differential between the populations of the 001 and 100 levels for any given rate of upper laser level excitation.

31. In the method of establishing operation of a flowing multigas laser of the type in which optical output is extracted in a region of optical gain from the 001 energy level of gaseous carbon dioxide, and electrical input power is coupled into the gas flow in the laser through electron collisions in the plasma within an electric discharge region, the steps of:

first, initiating flow of the carbon dioxide gas and a relaxant gas through the region of optical gain, and flow, through the regions of the electric discharge and optical gain, of gaseous nitrogen;

second, establishing an electric discharge plasma in the electric discharge region;

third, adjusting the amount of carbon dioxide, the amount of nitrogen flow and the ratio of the magnitude of the electric field to the number density of un-ionized gas particles in the electric discharge region to provide substantially the maximum rate of excitation of the 001 level of carbon dioxide in the optical gain region, per electron per un-ionized gas particle in the electric discharge region;

then repetitively as necessary, to increase optical power output:

a. increasing the magnitude of the electric field and the pressure of gas in the electric discharge region to levels at which a further increase in both of them results in the initiation of localized arcing within the plasma; and b. adjusting the amount of relaxant gas and the mass flow rate through the region of optical gain to provide, throughout the region of optical gain, population of the 010 level less than a significant fraction of the total population of carbon dioxide at a temperature above the precipitation temperature of the carbon dioxide at the pressure of said gaseous flow within the region of optical gain, the amount of relaxant gas being that which provides rates of relaxation of the 010 level and the 001 level which with the rate of stimulated photon emission provide substantially maximum positive differential between the populations of the 001 and 100 levels for any given rate of upper laser level excitation.

32. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, while monitoring optical output power, adjusting the amount of lasing gas flow, the amount of additional gas flow, and the ratio of the magnitude of the electric field to the number density of un-ionized gas particles within the electric field region for a peak in optical output power;

then repetitively as necessary, to increase optical power output:

a. adjusting the magnitude of the electric field and the number density of un-ionized gas in the region of the electric field to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

33. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, while monitoring optical output power, and electrical input power, adjusting the amount of lasing gas flow, the amount of additional gas flow, and the ratio of the magnitude of the electric field to the number density of un-ionized gas particles within the electric field region for maximum optical output efficiency;

then repetitively as necessary, to increase optical power output:

a. adjusting the magnitude of the electric field and the number density of un-ionized gas in the region of the electric field to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides a rate of relaxation of said upper energy state and the upper laser level which with the rate of stimulated photon emission provide substantially maximum positive differential between upper and lower level populations for any given rate of upper laser level excitation.

34. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, adjusting the amount of lasing gas flow, the amount of additional gas flow, and the ratio of the magnitude of the electric field to the number density of un-ionized gas particles within the electric field region to provide substantially the maximum rate of excitation of the upper laser level of the lasing gas in the region of optical gain, per electron per un-ionized gas particle in the electric field region;

then repetitively as necessary, to increase optical power output:

a. adjusting the magnitude of the electric field and the number density of un-ionized gas in the region of the electric field to increase, at said ratio, the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

35. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in an electric field region, the steps of:

first, initiating flow of the lasing gas and a relaxant gas through the region of optical gain, and flow, through the regions of the electric field and optical gain, of additional gas instrumental in promoting transfer of electrical input power into upper laser level excitation of the lasing gas;

second, initiating an electric field in the electric field region and a flow of electrons therein;

third, adjusting the amount of lasing gas flow, the amount of additional gas flow, and the ratio of the magnitude of the electric field to the number density of un-ionized gas particles within the electric field region to provide substantially the maximum rate of excitation of the upper laser level of lasing gas within the optical gain region, per electron per un-ionized gas particle in the electric field region;

then repetitively as necessary, to increase optical power output:

a. adjusting the magnitude of the electric field, the number density of un-ionized gas in the region of the electric field, and the ratio of them to a value in excess of said ratio, to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process of the lasing gas less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

36. In the method of establishing operation of a flowing $CO_2$, $N_2$, He laser of the type in which optical output is extracted in a region of optical gain from the 001 level of $CO_2$ and electrical input power is coupled into the gas flow in the laser through electron collisions in the plasma within the optical gain region, the steps of:

first, initiating flow of gaseous $CO_2$, $N_2$ and He, through the region of optical gain;

second, establishing an electric discharge plasma in the optical gain region;

third, adjusting the relative proportions of $CO_2$ and $N_2$ and the ratio of the magnitude of the electric field to the number density of un-ionized gas particles to provide substantially the maximum rate of excitation of the 001 level per electron per un-ionized gas particle;

then repetitively as necessary, to increase optical power output:

a. increasing both the magnitude of the electric field and the number density of un-ionized gas to increase the rate of excitation of the 001 level; and b. adjusting the amount of He and the total gas mass flow rate to provide, throughout the region of optical gain, population of the 010 level of $CO_2$ less than a significant fraction of the total population of $CO_2$ at a temperature above the precipitation temperature of the $CO_2$ at the pressure of said gaseous flow, the amount of He being that which provides rates of relaxation of the 010 level and the 001 level of $CO_2$ which with the rate of stimulated photon emission provide substantially maximum positive differential between the populations of the 001 and 100 levels for any given rate of upper laser level excitation.

37. In the method of establishing operation of a flowing multigas laser system of the type in which optical output is extracted in a region of optical gain from an upper laser level of a lasing gas, and electrical input power is coupled into the gas flow in the laser through electron collisions in an electric discharge plasma, a gas instrumental in promoting transfer of electrical input power into upper laser level excitation of the lasing gas flowing through the region of the plasma, the improvement comprising:

providing a total gaseous mass flow rate through the plasma to provide, as a result of losses in said plasma, a current-voltage characteristic which is flow dominated as a result of the losses associated with said mass flow.

38. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:

providing an electric field in the electric field region and a flow of electrons therein; and providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow, and the ratio of the magnitude of the electric field to the number density of the un-ionized gas providing substantially the maximum rate of excitation of the upper laser level of the lasing gas within the region of optical gain, the gas flowing through the region of optical gain, having a population of the lower laser level of the lasing gas substantially equal to the population of the upper energy state of the limiting relaxation process, through the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation, the gas flowing through the region of optical gain having a temperature to provide, throughout the region of optical gain, population of said upper energy state to provide, at the pressure thereof, number density difference between the upper and lower laser levels to provide a gain not less than one-half percent per centimeter of optical gain path length.

39. In the method of establishing operation of a flowing $CO_2$, $N_2$, He laser of the type in which optical output is extracted in a region of optical gain from the 001 level of $CO_2$ and electrical input power is coupled into the gas flow in the laser through electron collisions in the plasma within the optical gain region, the steps of:
  first, initiating flow of gaseous $CO_2$, $N_2$ and He, through the region of optical gain;
  second, establishing an electric discharge plasma in the optical gain region;
  third, adjusting the relative proportions of $CO_2$ and $N_2$ and the ratio of the magnitude of the electric field to the number density of un-ionized gas particles to provide substantially the maximum rate of excitation of the 001 level per electron per un-ionized gas particle;
  then repetitively as necessary, to increase optical power output at a gain of not less than one-half percent per centimeter of optical gain path length:
   a. increasing both the magnitude of the electric field and the number density of un-ionized gas to increase the rate of excitation of the 001 level; and
   b. adjusting the amount of He and the total gas mass flow rate to provide rates of relaxation of the 010 level and the 001 level of $CO_2$ which with the rate of stimulated photon emission provide substantially maximum positive differential between the populations of the 001 and 100 levels for any given rate of upper laser level excitation and to provide throughout the region of optical gain, population of the 010 level of $CO_2$ not greater than that population of the 100 level thereof to provide said gain at the pressure of said gaseous flow.

40. Operation of a multigas laser of the type in which optical output power is extracted in a region of optical gain from the 001 level of gaseous nitrous oxide, and electrical input power is coupled into gas flowing in the laser through electron collisions in the plasma within an electric discharge region, comprising:
  providing an electric discharge plasma in the electric discharge region; and
  providing flow of the nitrous oxide gas and a relaxant gas through the region of optical gain, and flow, through the regions of the electric field and optical gain, of additional gas instrumental in promoting transfer of electrical input power into the 001 level of nitrous oxide, the amount of nitrous oxide flow, the amount of additional gas flow and the ratio of the magnitude of the electric field to the number density of the un-ionized gas in the plasma providing substantially the maximum rate of excitation of the 001 level of the nitrous oxide within the region of optical gain, the nitrous oxide flowing through the region of optical gain having a temperature to provide, throughout the region of optical gain, population of the 010 level less than a significant fraction of the total population of nitrous oxide, the amount of relaxant gas being that which provides rates of relaxation of the 010 level and of the 001 level which with the rate of stimulated photon emission provide substantially maximum positive differential between the populations of the 001 and 100 levels for any given rate of upper laser level excitation.

41. In the method of establishing operation of a flowing multigas laser of the type in which optical output is extracted in a region of optical gain from the 001 energy level of gaseous nitrous oxide, and electrical input power is coupled into the gas flow in the laser through electron collisions in an electric field region, the steps of:
  first, initiating flow of the nitrous oxide gas and a relaxant gas through the region of optical gain, and flow, through the regions of the electric field and optical gain, of additional gas instrumental in promoting transfer of electrical input power into excitation of the 001 level of nitrous oxide;
  second, initiating an electric field in the electric field region and a flow of electrons therein;
  third, adjusting the amount of nitrous oxide gas flow, the amount of additional gas flow, and the ratio of the magnitude of the electric field to the number density of un-ionized gas particles within the electric field region to provide substantially the maximum rate of excitation of the 001 level of the nitrous oxide in the optical gain region, per electron per un-ionized gas particle in the electric field region;
  then repetitively as necessary, to increase optical power output:
   a. increasing the magnitude of the electric field and the number density of un-ionized gas in the region of the electric field to increase the rate of excitation of the 001 level of nitrous oxide within the region of optical gain; and
   b. adjusting the amount of relaxant gas and the mass flow rate through the region of optical gain to provide, throughout the region of optical gain, population of the upper energy state of the limiting relaxation process of the nitrous oxide less than a significant fraction of the total population thereof, the amount of relaxant gas being that which provides a rate of relaxation of said upper energy state and the upper laser level which with the rate of stimulated photon emission provide substantially maximum positive differential between the populations of the 001 and 100 levels of nitrous oxide for any given rate of upper laser level excitation.

42. Operation of a $CO_2$, $N_2$, He gas laser of the type in which optical output power is extracted in a region of optical gain from the 001 level of $CO_2$, and electrical input power is coupled into gas flowing in the laser through electron collisions in the plasma within an electric discharge region, comprising:
  providing an electric discharge plasma in the optical gain region; and
  providing flow of the $CO_2$, $N_2$ and He through the region of optical gain, the relative proportions of $CO_2$ and $N_2$ and the ratio of the magnitude of the electric field to the number density of the un-ionized gas in the plasma providing substantially the maximum rate of excitation of the 001 level of $CO_2$, the $CO_2$ having a temperature to provide, throughout the region of optical gain, population of the 010 level less than a significant fraction of the total population of $CO_2$, the amount of He being that which provides rates of relaxation of the 010 level and the 001 level of the lasing gas which with the rate of stimulated photon emission provide substantially maximum positive differential between the populations of the 001 and 100 levels for any given rate of upper laser level excitation.

43. In the method of establishing operation of a flowing multigas laser of the type in which optical output is extracted in a region of optical gain from the 001 energy level of gaseous carbon dioxide, and electrical input power is coupled into the gas flow in the laser through electron collisions in the plasma within an electric discharge region, the steps of:
  first, initiating flow of the carbon dioxide gas and a relaxant gas through the region of optical gain, and flow, through the regions of the electric discharge and optical gain, of gaseous nitrogen;
  second, establishing an electric discharge plasma in the electric discharge region;
  third, adjusting the amount of carbon dioxide, the amount of nitrogen flow and the ratio of the magnitude of the electric field to the number density of un-ionized gas particles in the electric discharge region to provide substantially the maximum rate of excitation of the 001 level of carbon dioxide in the optical gain region, per electron per un-ionized gas particle in the electric discharge region;
  then repetitively as necessary, to increase optical power output:
   a. adjusting the magnitude of the electric field and the pressure of gas in the electric discharge region; and
   b. adjusting the amount of relaxant gas and the mass flow rate through the region of optical gain to provide, throughout the region of optical gain, population of the 010 level less than a significant fraction of the total population of carbon dioxide at a temperature above the precipitation temperature of the carbon dioxide at the pressure of said gaseous flow within the region of optical gain, the amount of relaxant gas being that which provides rates of relaxation of the 010 level and the 001 level which with the rate of stimulated photon emission provide substantially maximum positive differential between the populations of the 001 and 100 levels for any given rate of upper laser level excitation.

44. Operation of a multigas laser of the type in which optical output power is extracted in a region of optical gain, from an upper laser level of a lasing gas having a limiting self-relaxation process between a lower laser level and the ground state with a rate substantially slower than the rate of stimulated photon emission, and electrical input power is coupled into gas flowing in the laser through electron collisions in an electric field region, comprising:
  providing an electric field in the electric field region and a flow of electrons therein; and
  providing flow of the lasing gas and a relaxant gas through the region of optical gain, and flow, through the regions of the electric field and optical gain, of additional gas instrumental in promoting transfer of electrical input power into upper laser level excitation of the lasing gas, the amount of lasing gas flow, the amount of additional gas flow and the ratio of magnitude of the electric field to the number density of the un-ionized gas determined in accordance with the relationships:

$$-\frac{1}{3}\left(\frac{E}{N}\right)^2 \frac{u\frac{df}{du}}{\sum_j \delta_j Q_{ej} + \alpha\, Q_{ei}} = \sum_{jk} \delta_j \int_u^{u+u_{jk}} uf Q_{jk} du$$

$$+ \left[\sum_j \frac{2m}{M_j}\delta_j u^2 Q_{ej} + \frac{2m}{M_i}\alpha\, u^2 Q_{ei}\right]\left[f + u_g \frac{df}{du}\right]$$

$$+ 2\alpha\, u^2 Q_{ee}\left[f\int_0^u u'^{1/2}f'du' + \frac{2}{3}\frac{df}{du}\right]\left[\int_0^u u'^{2/3}f'du'\right.$$

$$\left. + u^{3/2}\int_u^\infty f'du'\right]$$

where
$E$ is the electric field
$N$ is the total number density of neutral gas particles
$u$ is the electron energy
$f$ is the electron energy distribution function
$j$ denotes energy state $j$ of a gas specie
$\delta_j = n_j/N$ the fractional concentration of a specie of gas at energy $j$
$Q_{ej}$ is the electron-neutral momentum transfer cross section for specie-state $j$, as a function of electron energy
$\alpha = n_e/N$ the degree of ionization in the plasma
$Q_{ei}$ is the effective electron-ion momentum transfer cross section
$k$ denotes energy state $k$ of a gas specie
$u_{jk}$ is the energy change going from state $j$ to state $k$
$Q_{jk}$ is the inelastic cross section for the electron collisional process which produces a change from state $j$ to state $k$, as a function of electron energy
$m$ is the electron mass
$M_j$ is the mass of specie $j$
$M_i$ is the mass of an ion of species $i$
$u_g$ is the effective energy of the gaseous bath in the electric field region
$Q_{ee}$ is the effective electron-electron momentum transfer cross section
$u'$ is an arbitrary selected trial value of $u$
and $f'$ is an arbitrary selected trial value of $f$
and $$-\left(\frac{E}{N}\right)^2 e\left(\frac{2e}{m}\right)^{1/2}\int_0^\infty \frac{u\frac{df}{du}}{\sum_j \delta_j Q_{ej}} du = e\left(\frac{2e}{m}\right)^{1/2}\sum_j \delta_j \frac{2m}{M_j}$$

$$\int_0^\infty u^2 Q_{ej}\left(f + u_g \frac{df}{du}\right)du + e\left(\frac{2e}{m}\right)^{1/2}\sum_{jk}\delta_j u_{jk}\int_u^\infty uf Q_{jk} du$$

the gas flowing through the region of optical gain having a temperature to provide, throughout the region of optical gain, population of the upper energy state of the limiting relaxation process less than a significant fraction of the total population of the lasing gas, said temperature being above the precipitation temperature of the lasing gas at the pressure of said gas flow through the region of optical gain, the amount of relaxant gas being that which provides rates of relaxation of the upper energy state of the limiting relaxation process and the upper laser level which with the rate of stimulated photon emission provide substantially maximum positive differential between upper and lower laser level populations for any given rate of upper laser level excitation.

45. In the method of establishing operation of a flowing multigas laser of the type in which optical output is extracted in a region of optical gain from an upper laser level of a lasing gas having a limiting self-relaxation process between a lower laser level and the ground state with a rate substantially slower than the rate of stimulated photon emission, and electrical input power is coupled into the gas flow in the laser through electron collisions in the plasma within an electric discharge region, the steps of:
  first, initiating flow of the lasing gas and a relaxant gas through the region of optical gain, and flow, through the regions of the electric discharge and optical gain, of additional gas instrumental in promoting transfer of electrical input power into upper laser level excitation of the lasing gas;
  second, establishing an electric discharge plasma in the electric discharge region;
  third, adjusting the ratio of the magnitude of the electric field to the number density of un-ionized gas particles, the amount of lasing gas flow and the amount of additional gas flow in accordance with the relationships:

$$-\frac{1}{3}\left(\frac{E}{N}\right)^2 \frac{u\frac{df}{du}}{\sum_j \delta_j Q_{ej} + \alpha\, Q_{ei}} = \sum_{jk} \delta_j \int_u^{u+u_{jk}} uf Q_{jk} du$$

$$+ \left[\sum_j \frac{2m}{M_j}\delta_j u^2 Q_{ej} + \frac{2m}{M_i}\alpha\, u^2 Q_{ei}\right]\left[f + u_g \frac{df}{du}\right]$$

$$+ 2\alpha\, u^2 Q_{ee}\left[f\int_0^u u'^{1/2}f'du' + \frac{2}{3}\frac{df}{du}\right]\left[\int_0^u u'^{3/2}f'du'\right.$$

$$\left. + u^{3/2}\int_u^\infty f'du'\right]$$

where
$E$ is the electric field
$N$ is the total number density of neutral gas particles
$u$ is the electron energy
$f$ is the electron energy distribution function
$j$ denotes energy state $j$ of a gas specie
$\delta_j = n_j/N$ the fractional concentration of a specie of gas at energy $j$
$Q_{ej}$ is the electron-neutral momentum transfer cross section for specie-state $j$, as a function of electron energy
$\alpha = n_e/N$ the degree of ionization in the plasma
$Q_{ei}$ is the effective electron-ion momentum transfer cross section
$k$ denotes energy state $k$ of a gas specie
$u_{jk}$ is the energy change going from state $j$ to state $k$
$Q_{jk}$ is the inelastic cross section for the electron collisional process which produces a change from state $j$ to state $k$, as a function of electron energy
$m$ is the electron mass
$M_j$ is the mass of specie $j$
$M_i$ is the mass of an ion of species $i$
$u_g$ is the effective energy of the gaseous bath in the electric field region
$Q_{ee}$ is the effective electron-electron momentum transfer cross section
$u'$ is an arbitrary selected trial value of $u$
and
$f'$ is an arbitrary selected trial value of $f$
and $$-\frac{\left(\frac{E}{N}\right)^2}{3} e \left(\frac{2e}{m}\right)^{1/2} \int_0^\infty \frac{u \frac{df}{du}}{\sum_j \delta_j Q_{ej}} = e \left(\frac{2e}{m}\right)^{1/2} \sum_j \delta_j \frac{2m}{m_j}$$

$$\int_0^\infty u^2 Q_{ej} \left(f + u_g \frac{df}{du}\right) du$$

$$+ e \left(\frac{2e}{m}\right)^{1/2} \sum_{jk} \delta_j u_{jk} \int_0^\infty uf Q_{jk} du$$

then repetitively as necessary, to increase optical power output:

a. adjusting the magnitude of the electric field and the number density of un-ionized gas in the region of the electric field to increase the rate of excitation of the upper laser level of the lasing gas within the region of optical gain; and b. adjusting the amount of relaxant gas and the mass flow rate through the region of optical gain to provide, throughout the region of optical gain, population of the upper energy state of the limiting relaxation process less than a significant fraction of the total population of the lasing gas at a temperature above the precipitation temperature of the lasing gas at the pressure of said gaseous flow within the region of optical gain, the amount of relaxant gas being that which provides rates of relaxation of said upper energy state and the upper laser level which with the rate of stimulated photon emission provide substantially maximum positive differential between upper and lower laser level populations for any given rate of upper laser level excitation.

* * * * *

UNITED STATES PATENT OFFICE
CERTIFICATE OF CORRECTION

Patent No. 3,641,457     Dated February 8, 1972

Inventor(s) Clyde O. Brown and Robert H. Bullis

It is certified that error appears in the above-identified patent and that said Letters Patent are hereby corrected as shown below:

Column 23, line 28, "of flowing" should read -- of a flowing --

Column 24, line 34, "with the rate" should read -- with a rate --

Column 30, lines 30-32, cancel "said temperature being above the precipitation temperature of the lasing gas at the pressure of said gas flow through the region of optical gain,"

Column 32, line 3, "relaxant flow" should read -- relaxant gas flow --

Column 36, line 51, "optical poser" should read -- optical power --

Column 38, line 46, "lower level" should read -- lower laser level --

UNITED STATES PATENT OFFICE
CERTIFICATE OF CORRECTION

Patent No. 3,641,457                 Dated February 8, 1972

Inventor(s)   Clyde O. Brown and Robert H. Bullis        PAGE - 2

It is certified that error appears in the above-identified patent and that said Letters Patent are hereby corrected as shown below:

Column 43, near line 35, first line of equation, "$\sum_j \delta_j Q_{ej} \alpha Q_{ei}$"

should read -- $\sum_j \delta_j Q_{ej} + \alpha Q_{ei}$ --

Column 43, near line 43, third line of equation, "$u'^{2/3} f' \, du'$"

should read -- $u'^{3/2} f' \, du'$ --

Column 44, near line 6, first line of equation, Second occurrence, "$\left(\frac{2e}{m}\right)^{1\ 2}$" should read -- $\left(\frac{2e}{m}\right)^{1/2}$ --

Column 44, near line 10, second line of equation "$\left(\frac{2e}{m}\right)^{1\ 2}$"

should read -- $\left(\frac{2e}{m}\right)^{1/2}$ --

Column 44, near line 61, fifth line of equation, "$u'^{3\ 2} f' \, du'$"

should read -- $u'^{2/3} f' \, du'$ --

Column 44, near line 64, sixth line of equation, "$+u^{3\ 2}$"

should read -- $+u^{3/2}$ --

Column 46, line 1, "$\left(\frac{2e}{m}\right)^{1\ 2}$" should read -- $\left(\frac{2e}{m}\right)^{1/2}$ --

Signed and sealed this 11th day of July 1972.

(SEAL)
Attest:

EDWARD M. FLETCHER, JR.
Attesting Officer

ROBERT GOTTSCHALK
Commissioner of Patents